(12) United States Patent
Gupta

(10) Patent No.: US 11,061,919 B1
(45) Date of Patent: Jul. 13, 2021

(54) COMPUTER-IMPLEMENTED APPARATUS AND METHOD FOR INTERACTIVE VISUALIZATION OF A FIRST SET OF OBJECTS IN RELATION TO A SECOND SET OF OBJECTS IN A DATA COLLECTION

(71) Applicant: Dhirj Gupta, Cypress, TX (US)

(72) Inventor: Dhirj Gupta, Cypress, TX (US)

( * ) Notice: Subject to any disclaimer, the term of this patent is extended or adjusted under 35 U.S.C. 154(b) by 0 days.

(21) Appl. No.: 16/454,464

(22) Filed: Jun. 27, 2019

Related U.S. Application Data

(60) Provisional application No. 62/697,785, filed on Jul. 13, 2018.

(51) Int. Cl.

| | |
|---|---|
| *G06F 16/24* | (2019.01) |
| *G06F 9/00* | (2006.01) |
| *G06F 3/048* | (2013.01) |
| *G06F 16/248* | (2019.01) |
| *G06F 9/451* | (2018.01) |
| *G06F 3/0484* | (2013.01) |

(52) U.S. Cl.
CPC ............ *G06F 16/248* (2019.01); *G06F 9/451* (2018.02); *G06F 3/04847* (2013.01)

(58) Field of Classification Search
CPC ..... G06F 16/248; G06F 9/451; G06F 3/04847
See application file for complete search history.

(56) References Cited

U.S. PATENT DOCUMENTS

| | | | |
|---|---|---|---|
| 5,903,478 A * | 5/1999 | Fintel ..................... | G06F 9/451 703/6 |
| 6,400,366 B1 | 6/2002 | Davies et al. | |
| 6,539,387 B1 * | 3/2003 | Oren ...................... | G06F 16/748 |
| 6,742,003 B2 | 5/2004 | Heckerman et al. | |
| 6,829,615 B2 * | 12/2004 | Schirmer ............ | G06F 16/9024 |
| 7,529,735 B2 * | 5/2009 | Zhang .................... | G06N 5/022 |
| 7,613,992 B1 * | 11/2009 | Raichur ................ | G06F 16/951 715/201 |

(Continued)

OTHER PUBLICATIONS

YouTube Video; Using the Cluster Wheel, The Case Law Database; https://www.youtube.com/watch?v=bJW7OC44frU; Jul. 7, 2015; 2pp.

(Continued)

*Primary Examiner* — Daeho D Song
(74) *Attorney, Agent, or Firm* — Sunstein LLP

(57) ABSTRACT

A computer-implemented method for interactive visualization of a first set of objects in relation to a second set of objects in a data collection, wherein each of the second set of objects is hierarchically structured includes parsing the first set of objects in relation to the second set of objects in order to generate a mapping between the first set of objects and the second set of objects. The method further includes causing display of a representation of the first set as a central node and a representation of the second set as a set of topic nodes surrounding the central node or surrounded by the central node, the displayed representations constituting a sieve diagram. The method also includes causing display in the sieve diagram of a set of relationships between the first set of objects and the second set of objects by providing a graphical linkage directly or indirectly between the central node and each node that corresponds to a member of the second set.

18 Claims, 45 Drawing Sheets
(5 of 45 Drawing Sheet(s) Filed in Color)

(56) References Cited

U.S. PATENT DOCUMENTS

| | | | |
|---|---|---|---|
| 8,145,636 B1* | 3/2012 | Jeh | G06F 16/353 707/736 |
| 8,244,908 B2* | 8/2012 | Dempo | G06F 9/542 709/238 |
| 8,352,465 B1* | 1/2013 | Jing | G06F 16/54 707/723 |
| 8,949,111 B2 | 2/2015 | Jakubik | |
| 9,015,160 B2 | 4/2015 | Jakubik | |
| 9,026,535 B2 | 5/2015 | Jakubik | |
| 9,069,861 B2 | 6/2015 | Copps et al. | |
| 9,201,971 B1 | 12/2015 | Jakubik et al. | |
| 9,218,427 B1* | 12/2015 | Thompson, III | G06F 16/24573 |
| 9,229,610 B2* | 1/2016 | Lu | G06F 3/0481 |
| 9,569,484 B2 | 2/2017 | Copps et al. | |
| 9,785,712 B1* | 10/2017 | Lazar | G06F 16/951 |
| 9,792,358 B2 | 10/2017 | Jakubik et al. | |
| 9,881,066 B1* | 1/2018 | Yousaf | G06F 3/0482 |
| 9,977,831 B1* | 5/2018 | Raichur | G06F 16/95 |
| 9,992,230 B1* | 6/2018 | Haverty | G06F 21/45 |
| 9,996,623 B1 | 6/2018 | Ferrill et al. | |
| 10,042,934 B2 | 8/2018 | Copps et al. | |
| 10,311,085 B2* | 6/2019 | Rezaei | G06Q 30/0269 |
| 10,332,007 B2* | 6/2019 | Knight | G06F 16/93 |
| 10,339,183 B2* | 7/2019 | Kohlmeier | G06Q 10/10 |
| 10,387,892 B2* | 8/2019 | Rezaei | G06Q 10/10 |
| 10,445,300 B2* | 10/2019 | Hu | G06F 16/9024 |
| 2002/0083034 A1* | 6/2002 | Orbanes | G06F 16/954 |
| 2004/0024739 A1* | 2/2004 | Copperman | G06F 16/353 |
| 2004/0078288 A1* | 4/2004 | Forbis | G06Q 10/0875 705/26.8 |
| 2005/0104885 A1* | 5/2005 | Jager | G06T 11/20 345/440 |
| 2005/0267871 A1* | 12/2005 | Marchisio | G06F 16/3338 |
| 2006/0047649 A1* | 3/2006 | Liang | G06F 16/951 |
| 2006/0106793 A1* | 5/2006 | Liang | G06F 16/3329 |
| 2006/0288023 A1* | 12/2006 | Szabo | G06F 16/10 |
| 2008/0228761 A1* | 9/2008 | Kei Leung | G06F 16/90 |
| 2009/0012941 A1* | 1/2009 | Schaaf | G06F 21/6218 |
| 2009/0119262 A1* | 5/2009 | Guo | G06F 16/954 |
| 2009/0265320 A1* | 10/2009 | Kelley | H04L 12/4641 |
| 2010/0114950 A1* | 5/2010 | Raichur | G06F 16/9535 707/770 |
| 2012/0060216 A1* | 3/2012 | Chaudhri | G16H 70/00 726/21 |
| 2012/0290926 A1* | 11/2012 | Kapadia | G06F 40/166 715/255 |
| 2013/0185642 A1* | 7/2013 | Gammons | G06F 3/0482 715/733 |
| 2013/0246430 A1* | 9/2013 | Szucs | G06F 16/313 707/738 |
| 2014/0098103 A1* | 4/2014 | Hirsch | G06T 11/206 345/440 |
| 2015/0143302 A1* | 5/2015 | Chang | G06F 3/04815 715/849 |
| 2016/0004756 A1* | 1/2016 | Rosenthal | G06F 16/338 707/706 |
| 2016/0210355 A1* | 7/2016 | Krantz, III | G06F 16/335 |
| 2016/0358274 A1* | 12/2016 | George | G06Q 10/10 |
| 2017/0109933 A1* | 4/2017 | Voorhees | G06T 19/00 |
| 2019/0303433 A1* | 10/2019 | Brenne | G06F 16/26 |
| 2020/0097726 A1* | 3/2020 | Gurule | H04N 21/84 |

OTHER PUBLICATIONS

Information Interfaces Website; https://web.archive.org/web/20170712035006/http://www.cc.gatech.edu/gvu/ii/sunburst/; Jul. 12, 2017; 4 pages.

YouTube video; Brainspace 6—Augmenting Investigative Intelligence; https://youtu.be/bZegSkS9Vkg; Oct. 28, 2017; 2 pages.

* cited by examiner

| Id | Title | Mappings |
|---|---|---|
| 1 | Increase in telencephalic dopamine... | Brain, Hindbrain, Midbrain, Forebrain, Telencephalon, Diencephalon |
| 2 | Isolated Medial Rectus Nuclear... | Brain, Midbrain |
| 3 | Cell segregation in the vertebrate hindbrain... | Brain, Hindbrain |
| 4 | Cerebellar Premotor Output Neurons... | Brain, Midbrain, Hindbrain, Forebrain, Diencephalon, Thalamus |
| 5 | Synaptic changes in GABAA... | Brain, Forebrain, Diencephalon, Thalamus |
| 6 | Both Ox1R and Ox2R orexin... | Brain, Forebrain, Diencephalon, Hypothalamus |

2301

Magnitude-of-Mapping Retrieval Module

↑

2601

| Topic | # mappings |
|---|---|
| Brain | 6 |
| Midbrain | 3 |
| Hindbrain | 3 |
| Forebrain | 4 |
| Telencephalon | 1 |
| Diencephalon | 4 |
| Thalamus | 2 |
| Hypothalamus | 1 |

Render Module

| Id | Title | Mappings |
|---|---|---|
| 1 | Increase in telencephalic dopamine... | Brain, Hindbrain, Midbrain, Forebrain, Telencephalon, Diencephalon |
| 2 | Isolated Medial Rectus Nuclear... | Brain, Midbrain |
| 3 | Cell segregation in the vertebrate hindbrain... | Brain, Hindbrain |
| 4 | Cerebellar Premotor Output Neurons... | Brain, Midbrain, Hindbrain, Forebrain, Diencephalon, Thalamus |
| 5 | Synaptic changes in GABA... | Brain, Forebrain, Diencephalon, Thalamus |
| 6 | Both Ox1R and Ox2R orexin... | Brain, Forebrain, Diencephalon, Hypothalamus |

2801

2301

107

*Documents returned in response to a '*' query...*

- Increase in the telencephalic dopamine...
- Isolated Medial Rectus Nuclear...
- Cell Segregation in the vertebrate hindbrain...
- Cerebellar Premotor Output Neurons...
- Synaptic changes in GABA...
- Both Ox1R and Ox2r orexin

Fig. 32

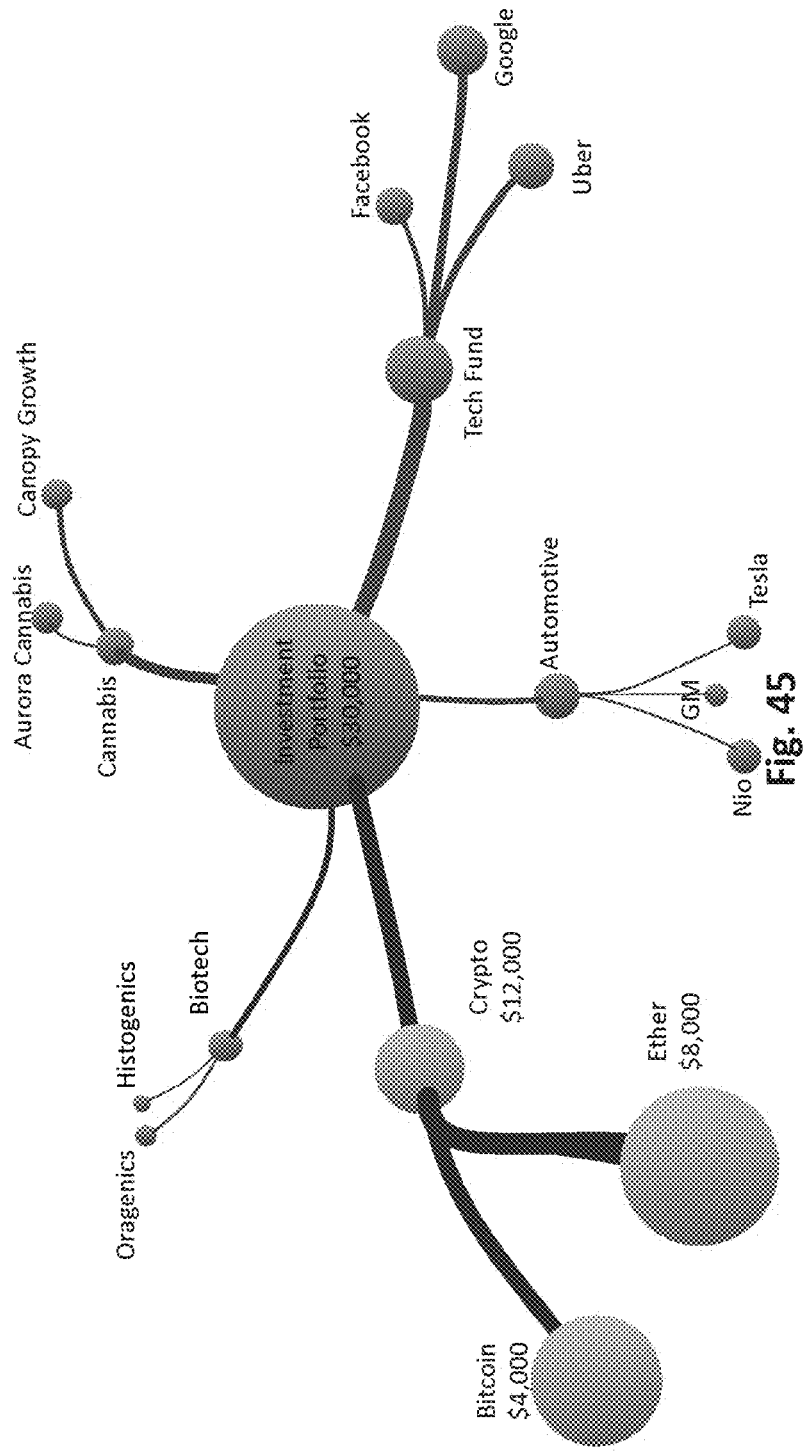

COMPUTER-IMPLEMENTED APPARATUS AND METHOD FOR INTERACTIVE VISUALIZATION OF A FIRST SET OF OBJECTS IN RELATION TO A SECOND SET OF OBJECTS IN A DATA COLLECTION

PRIORITY

This application claims the benefit of U.S. provisional patent application Ser. No. 62/697,785, filed Jul. 13, 2018, which is hereby incorporated, in its entirety, by reference.

TECHNICAL FIELD

The present invention relates to data displays, and more particularly to computer-implemented displays of data objects.

BACKGROUND

Systems employing graphic primitives to represent information are well known and have been employed in a variety of visualization systems. One of the advantages provided by such systems is that, due to the significant visual information processing capabilities of the human brain, it is generally easier for an individual to absorb and/or understand data represented visually than data represented in numerical or textual form. Further, complex and/or dense data which, if in a numerical or textual format would require multiple sheets of paper to be printed out or multiple screens views of a computer monitor to be displayed can be represented on a single computer monitor screen in a well-designed visualization.

In the search and retrieval context in particular, document results are often presented as a one-dimensional list of results that a user must scroll and click through. With the explosion of data in recent years, retrieval results can include hundreds and thousands of pages of list-based results for users to sift through. This has led to the advent of ever more sophisticated machine learning technologies to sort and rank the documents so that the most useful documents are more likely to be at the top of the "stack". However, in certain cases such as in research contexts, users urgently need to be aware of the full breadth of data available and to identify, create, and analyze meaningful subsets of the available information. In such situations, existing search and retrieval systems fall short of meeting users' needs. It is therefore desired to provide more sophisticated and powerful methods for users. Relevant existing systems include search and retrieval technologies, and clustering techniques such as the cluster-wheel (also known as the sunburst or multi-level pie chart).

SUMMARY OF THE EMBODIMENTS

In accordance with one embodiment of the invention, there is provided a computer-implemented method for interactive visualization of a first set of objects in relation to a second set of objects in a data collection, wherein each of the second set of objects is hierarchically structured. In this embodiment, the method implemented by computer processes including:

storing the first set of objects and storing the second set of objects;

parsing the first set of objects in relation to the second set of objects in order to generate a mapping between the first set of objects and the second set of objects;

storing the mapping;

causing display of a representation of the first set as a central node and a representation of the second set as a set of topic nodes surrounding the central node or surrounded by the central node, the displayed representations constituting a sieve diagram; and using the mapping to cause display in the sieve diagram of a set of relationships between the first set of objects and the second set of objects by providing a graphical linkage directly or indirectly between the central node and each node that corresponds to a member of the second set.

In a further related embodiment, the method further includes:

receiving a search query;

responsive to the received search query, performing a search, among the first set of objects, for a search results set of objects having a set of features matching features of the search query; and causing display of the search results set of objects.

Optionally the causing display of the search results set of objects includes causing display thereof as a list and causing display thereof as elements of the sieve diagram. Also optionally, the graphical linkage is a distribution line. In a further related embodiment, the method further includes, upon receiving a graphical selection by the user of a given one of the topic nodes in the sieve diagram, causing filtering of the first set of objects displayed to include only those objects corresponding to objects in the second set that are represented by the selected topic node. In another related embodiment, the method further includes, upon receiving a graphical selection by the user of a given distribution line in the sieve diagram, causing filtering of the first set of objects displayed to include only those objects corresponding to objects in the second set that are represented by the topic nodes to which the selected distribution line connects. In another related embodiment, the method further includes upon receiving a graphical selection by the user of a given central node in the sieve diagram, causing removal of any filtering caused by graphical selection of a topic node or of a distribution line. Optionally, the method further includes, upon the graphical selection by the user of the given one of the topic nodes, causing display of information pertinent to the selected topic node. Also optionally, the method further includes, upon the graphical selection by the user of the given distribution line, causing display of information pertinent to the selected distribution note or the topic node to which the selected distribution line connects. As a further option, the search query includes a Boolean expression, and wherein the method further includes evaluating the Boolean expression and performing the search using the evaluated expression. In a further related embodiment, the search query is defined at least in part by user selection of a set of graphical elements in the sieve diagram. Alternatively or in addition, the search query includes at least one Boolean operator defined by a user input. In a related embodiment, the method further includes, upon receipt of a user command to shrink displayed membership of the first set, causing the sieve diagram to display, as members of the first set, only those objects having features matching features of the search query. Optionally, the method further includes on invocation by a user of the topic map limiter, limiting display of objects in the second set. Optionally, the topic map limiter invokes display of a tier in which the display of objects in the second set is limited. Also optionally, the topic map limiter allows selection by the user of which topics to eliminate from the sieve diagram. Alternatively or in addition, the topic map limiter allows selection by the user of which topics to include in the sieve diagram.

BRIEF DESCRIPTION OF THE DRAWINGS

The patent or application file contains at least one drawing executed in color. Copies of this patent with color drawing(s) will be provided by the Patent and Trademark Office upon request and payment of the necessary fee.

The foregoing features of embodiments will be more readily understood by reference to the following detailed description, taken with reference to the accompanying drawings, in which:

FIG. 26 is a visual representation of example inputs and output data of an embodiment of the recommended "Magnitude-of-Mapping Retrieval Module" 2503 of FIG. 25, in accordance with an embodiment of the present invention;

FIG. 32 depicts how the document data stored in the system is utilized to render search results in the embodiment of the invention depicted in FIG. 24;

FIG. 45 is a perspective rendering of a three-dimensional sieve diagram in another embodiment of the present invention in which the distribution of a user's investments across a variety of funds is depicted.

DETAILED DESCRIPTION OF SPECIFIC EMBODIMENTS

Definitions

Figure 1:
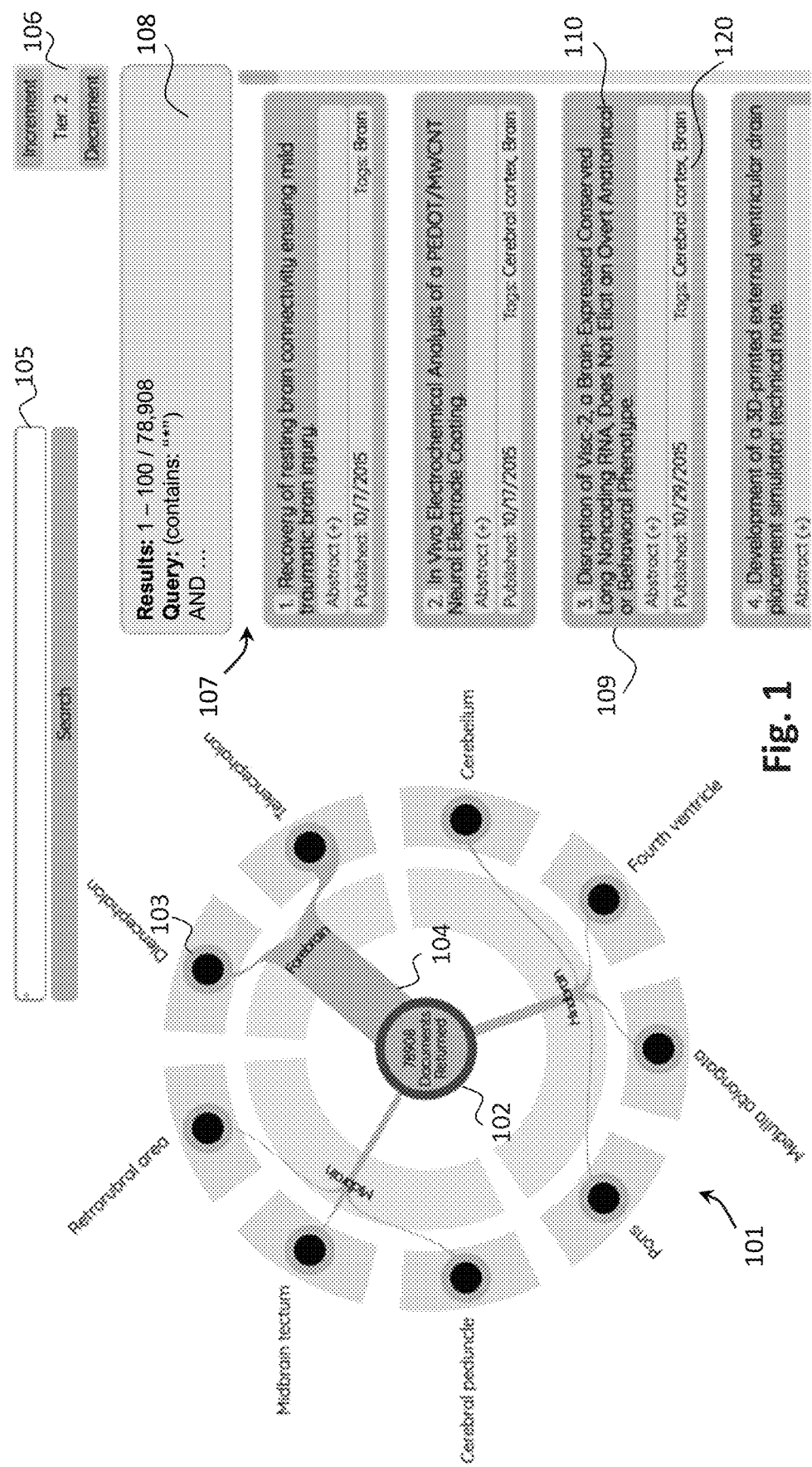
FIG. 1 is a representation of a display, generated by a computer executing a program in accordance with an embodiment of the present invention, that graphically represents relationships between first and second sets of objects, using, for the first set, a subset of documents from the NCBI PubMed document corpus, in this case illustrating results from a query to a database accessed by the program (wherein the second set is a hierarchy of topic nodes describing the anatomy of the brain)

As used in this description and the accompanying claims, the following terms shall have the meanings indicated, unless the context otherwise requires:

A "set" includes at least one member.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

An "object" is a machine-readable encoding of a data item that can be processed and utilized by a computer programming language, operating on a computing device.

A "set X" is a set of data objects that can be mapped against a hierarchical set of topic nodes, set Y, based on any criteria, including but not limited to input or output source(s), meta-tags or meta-information about the data objects, or the content of the data objects themselves, and for which those mappings can be quantified by some measurable magnitude for each member of the Set Y that Set X can be mapped against.

A "set Y" is a set of data objects with a defined hierarchical or heterarchical pattern of relationships between each other.

A "central node" is a display component, representing all members of the set X, and rendered either at the center of a sieve diagram or at the periphery of the sieve diagram. Distribution lines, wherein each distribution line corresponds to a subset of set X, emanate from the central node to connect to topic nodes. In one embodiment the central node represents a master document set that is subject to filtering by means of (i) graphically imposed constraints via the sieve diagram or (ii) search terms entered into a query box or (iii) other constraints, such as date range, specified as search facets. A central node may be represented as a circle, an arcuate slide, a square, an image, or another suitable visual element or combination of visual elements.

A "topic node" is a display component representing a member of the set Y. A topic node may be represented as a circle, an arcuate slice, a square, an image, or another suitable visual element or combination of visual elements. In one embodiment hierarchical topic nodes are rendered radially outward, away from the central node, so that the topmost node in the hierarchy is closest to the central node and the bottom-most nodes of the hierarchy are farthest from the central node. In a further related embodiment, graphically selecting a given topic node, associated with a class of members in set Y, will cause filtering of the set X (displayed at the central node) to include only members of set X that correspond to the selected topic node of set Y.

A "distribution line" is a line that connects a central node and a topic node. In one embodiment, the width of the distribution line, or some other characteristic of the line, is utilized to represent a number of the mappings between set X and members of set Y represented by the connected topic node. A line is rendered "indirectly" to a node corresponding to a given member of the second set when the line extends from the central node to a hierarchical parent of the given node and a further line extends from the hierarchical parent to the particular node.

A "sieve diagram" is a display composed of a set of central nodes, a set of topic nodes, and any distribution lines connecting a topic node to a central node.

A "topic map selector" is an interface component that allows the user to select which topic hierarchies to display in the sieve when the system is implemented so that set Y is composed of multiple independent hierarchical topic sets.

A "topic map limiter" is any interface component of functionality that lets user limit how much of a topic map hierarchy or heterarchy is to be displayed.

"Results" show either a subset or entirety of the results returned by either a traditional search-engine type search or a sieve filtration. If the embodiment implemented uses something other than a document set for set X, then results should be relevant to the set X used in the embodiment.

The visualizations depicted herein are original and improve upon cluster-wheel visualization. The embodiments described herein include novel functionality that can be implemented only using methods that leverage modern computer and information technology systems.

FIG. 1 is a representation of a display, generated by a computer executing a program in accordance with an embodiment of the present invention, that graphically represents relationships between first and second sets of objects, using, for the first set, a subset of documents from the NCBI PubMed document corpus, in this case illustrating results from a query to a database accessed by the program. (The second set is a hierarchy of topic nodes describing the anatomy of the brain.) The Sieve interface component 101 is composed of a central node 102, a set of topic nodes 103 like "Forebrain" and "Diencephalon", and a set of distribution lines 104 that emanate from the central node and connect to the topic nodes either directly or transitively through hierarchical parent topic nodes. In the embodiment depicted and in its current state, the central node 102 represents a master set of documents returned from the user-specified query entered using the search bar 105. Since the user-specified query is a "*", which this particular system interprets as a wild card, "return all documents", all 78,908 documents in the system are returned. Consequently, the central node 102, indicates that the master set of documents in response to the user-specified query is all 78,908 documents.

The distribution lines 104, emanating from the central node 102 and connecting to the various topic nodes 103, illustrate the number of documents returned from the user-specified query in the search bar 105 that also are related to the topic node 103 connected to, based upon the width of the distribution line 104. A thicker distribution line 104 means more documents in the system are related to a topic and a thinner distribution line 104 means fewer documents are thus related. No distribution line connecting to a topic node 103 means that there are no documents returned from the user-specified query in the search bar 105 that are related to the topic represented by the topic node 103. In the embodiment depicted, the distribution lines 104 indicate that there are documents related either directly to the topic represented by the topic node 103 connected to or that there are documents related to a subtopic of the topic represented by the topic node connected to. The topic map limiter 106 in this embodiment consists simply of an increment and decrement functionality that allows users to determine how many tiers of the hierarchy to display on screen. The results section 107 includes a results summary 108, in addition to a list of search results, which is composed of individual documents 109 that match the total user query, which is composed of the user input in the search bar 105 combined with the query state of the sieve 101. Since, in FIG. 1, the user has not performed any manipulations on the Sieve 101, the query is simply represented by the search input into the search bar 105. Each document returned includes the document's title 110, as well as a list of tags 120 that represent the topics, from the Set Y, that the document was mapped to. FIG. 1 represents a default, unmanipulated state of the computer-generated display.

In an example embodiment, the display of FIG. 1 is a computer user interface generated by the computer program. The computer user interface presents the sieve interface component 101, to graphically represent relationships between the first set of objects (subset of documents from the NCBI PubMed document corpus) and the second set of objects (topic nodes describing the anatomy of the brain), the search components 105, 108, 110, 120, and the topic map limiter 106 to the user via a computing device.

Figure 2:
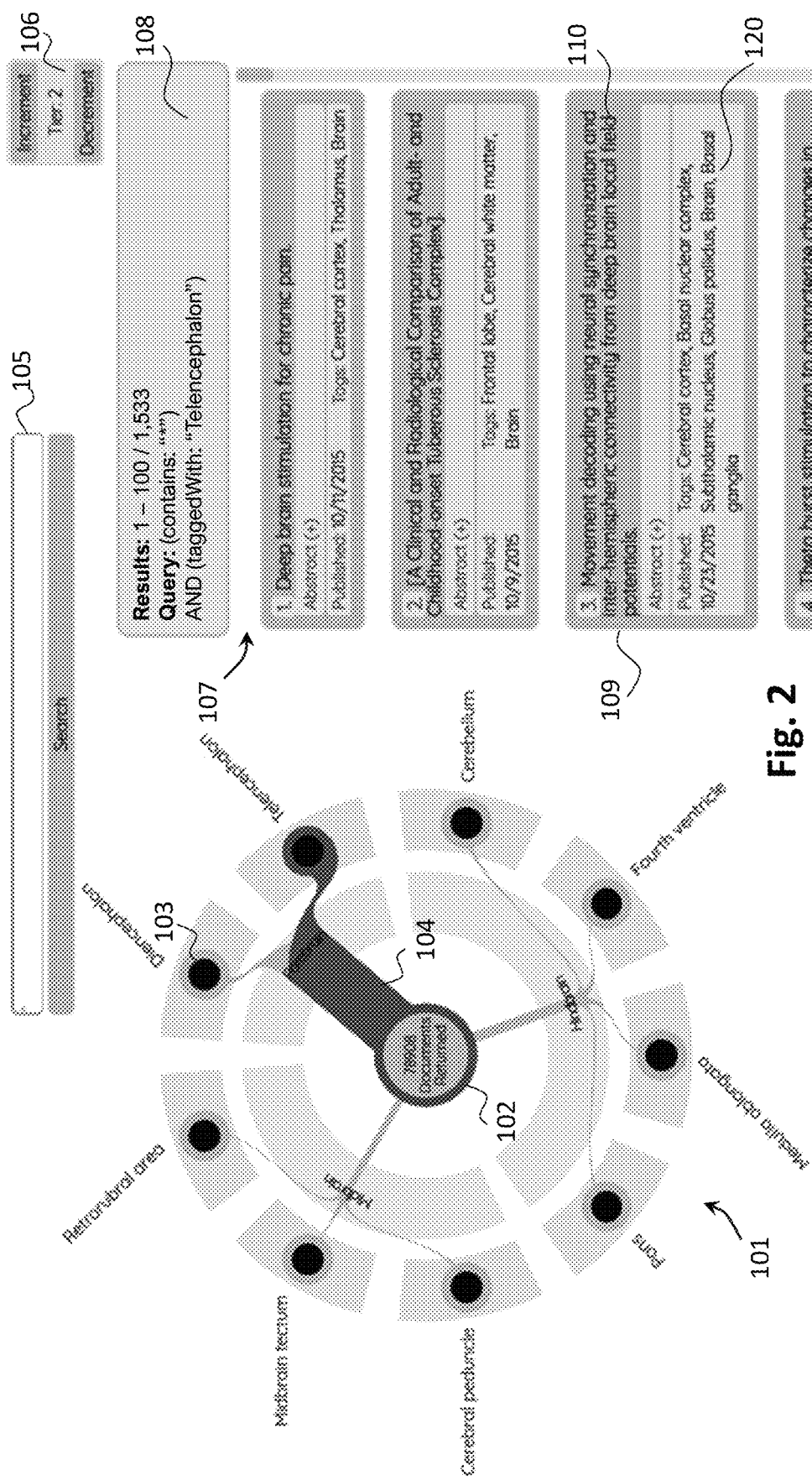
FIG. 2 is a further representation of the display of the embodiment depicted in FIG. 1, in which the user has selected the topic node "Telencephalon" in the FIG. 1 display.

FIG. 2 is a further representation of the display of the embodiment depicted in FIG. 1, in which the user has selected the topic node 103 representing the topic "Telencephalon" in the FIG. 1 display. As a result, the combined query, defined by the sieve 101 and the query entered in the search bar 105, is updated as shown in the results description 108. The documents returned in the search results 107 are now all documents returned from the "*" search query (all documents in the system) that are also tagged with "Telencephalon", which of the total 78,908 documents in the system, is 1,533 documents.

Figure 3:
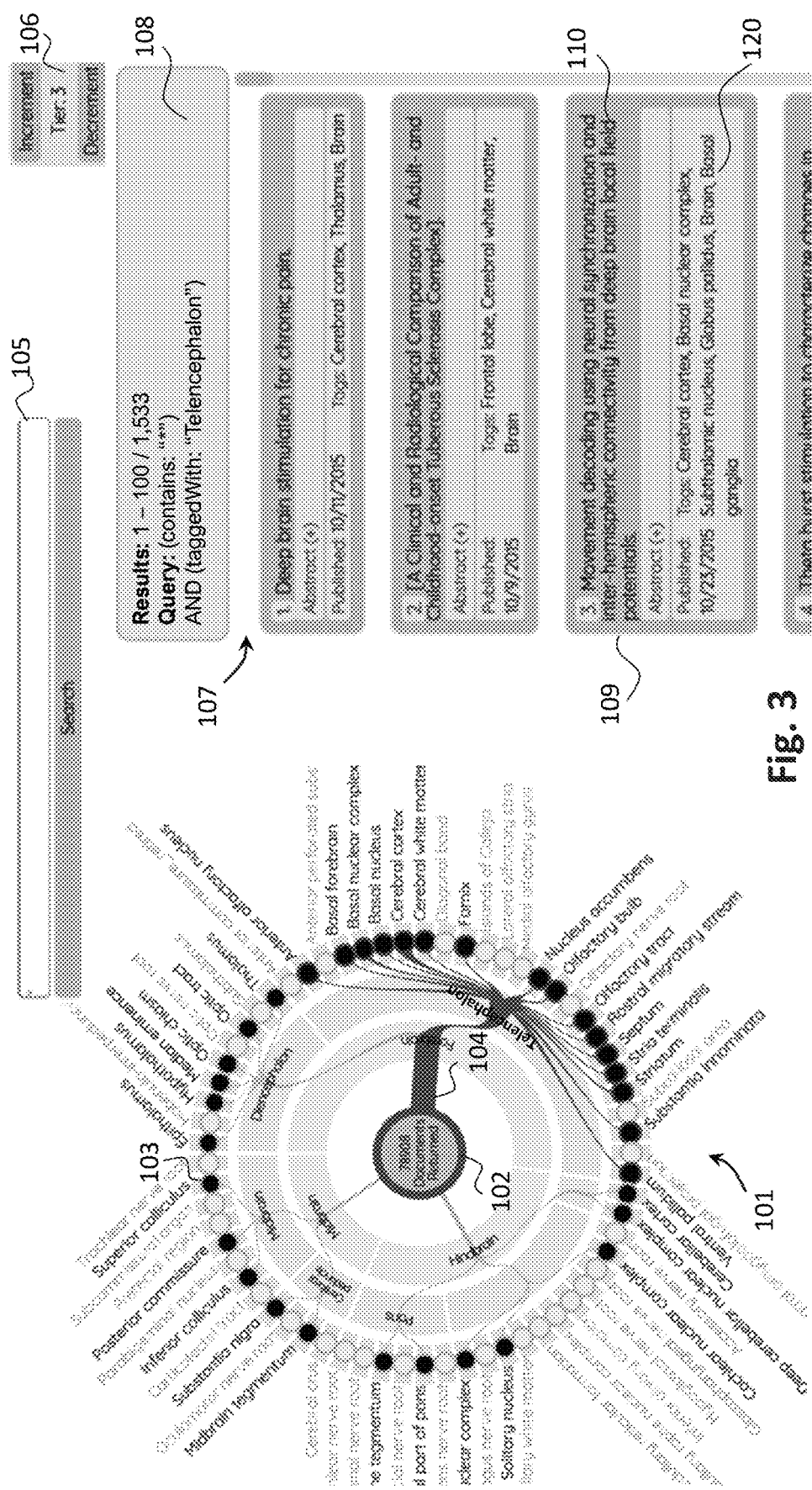
FIG. 3 is a further representation of the display of the embodiment depicted in FIG. 2, in which the user has incremented the number of tiers shown, using 106 in the FIG. 2 display.

FIG. 3 is a further representation of the display of the embodiment depicted in FIG. 2, in which the user has incremented the number of tiers shown, using the topic map limiter 106 in the FIG. 2 display. In this particular embodiment, the topic map limiter 106 includes only two buttons that trigger updates to the sieve 101, in order to show greater or fewer tiers of the hierarchical topic map displayed in the sieve 101. Whereas in FIG. 2, where the topic map limiter was set to "Tier: 2" and the sieve 101 showed only two tiers deep into the topic map of neuroanatomy, the user has set the topic map limiter 106 in FIG. 3 to "Tier: 3" and so the sieve 101 shows the top three tiers of the hierarchical topic map of neuroanatomy.

Figure 4:
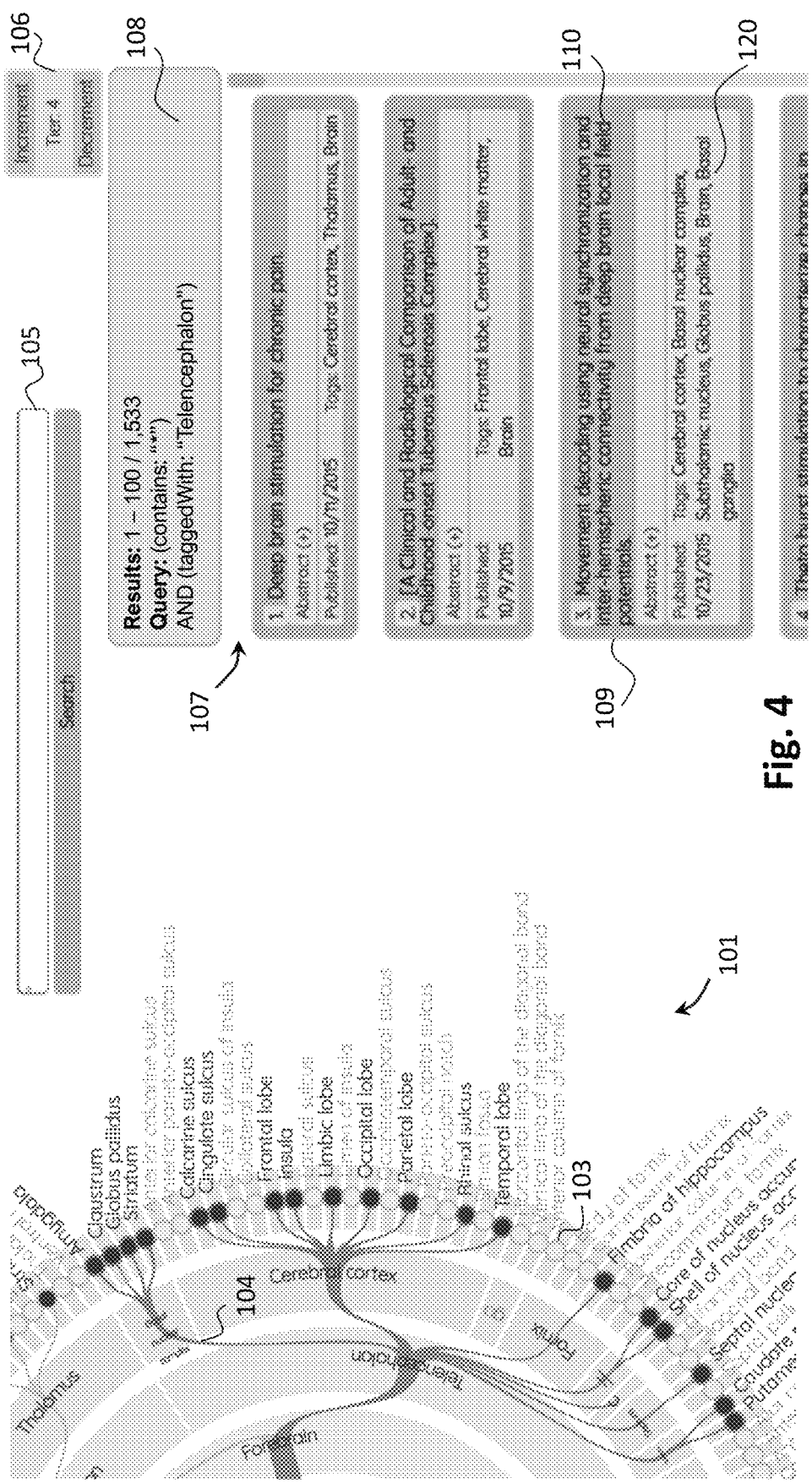
FIG. 4 is a further representation of the display of the embodiment depicted in FIG. 3, in which the user has incremented the number of tiers of the topic nodes displayed in 101 using 106, and also utilized the system's pan/zoom functionality to better visualize a portion of 101 that is of interest.

FIG. 4 is a further representation of the display of the embodiment depicted in FIG. 3, in which the user has incremented the number of tiers of the topic nodes displayed in 101 using topic map limiter 106, and also utilized the system's pan/zoom functionality to better visualize a portion of 101 that is of interest. Whereas in FIG. 3, where the topic map limiter was set to "Tier: 3" and the sieve 101 showed only the top three tiers of the topic map of neuroanatomy, the user has set the topic map limiter 106 in FIG. 4 to "Tier: 4," and so the sieve 101 shows the top four tiers of the hierarchical topic map of neuroanatomy. In this particular embodiment, the pan functionality is utilized by clicking and dragging the sieve diagram and the zoom functionality is utilized by use of the mouse wheel, where scrolling it up zooms in and scrolling it down zooms out.

Figure 5:
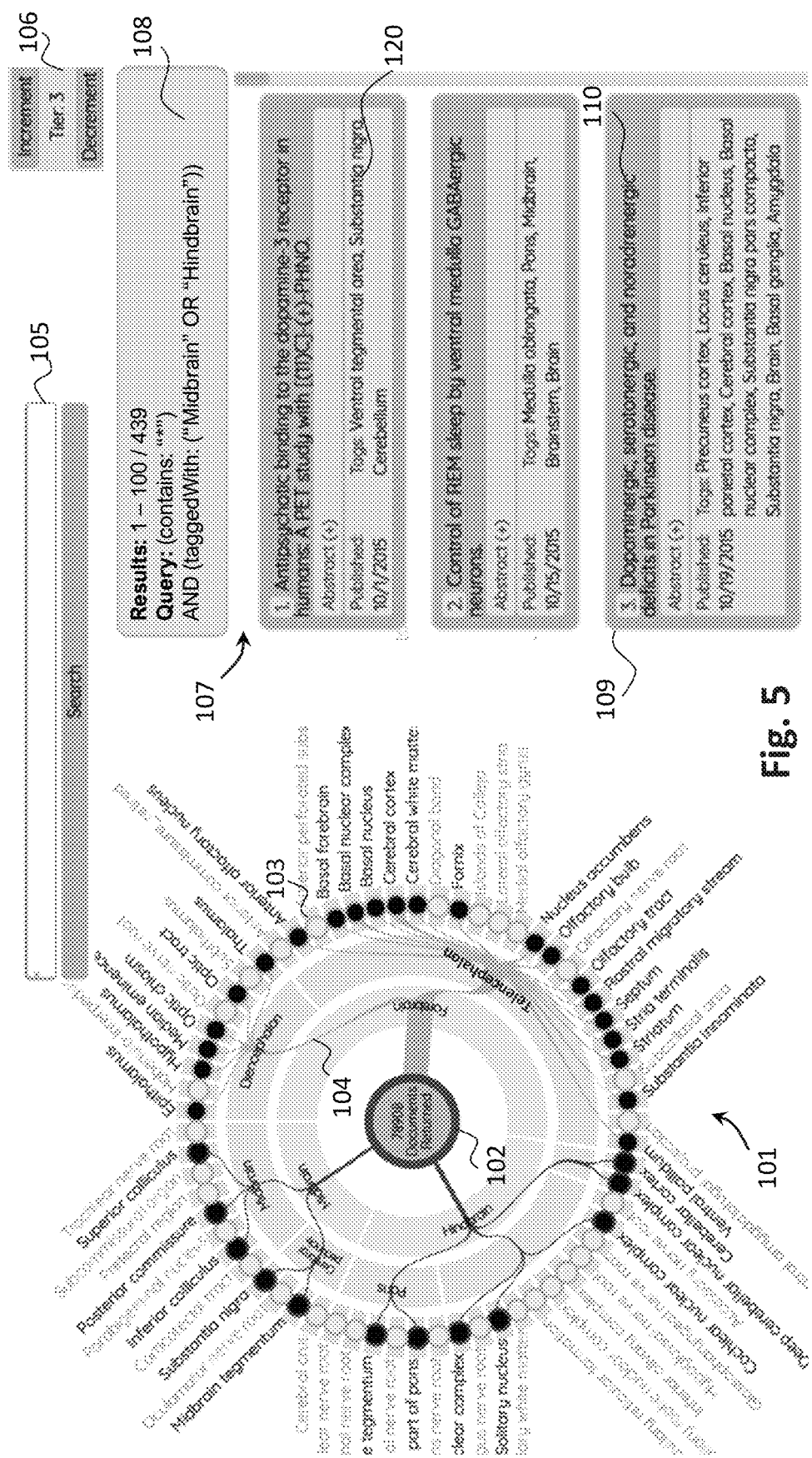
FIG. 5 is a further representation of the display of the embodiment depicted in FIG. 4, in which the user has decremented the number of topic nodes shown in 101 by using 106, and has made new topic node selections of "Midbrain" and "Hindbrain"

FIG. 5 is a further representation of the display of the embodiment depicted in FIG. 4, in which the user has decremented the number of topic nodes in the sieve 101 by using the topic map limiter 106, and has selected a different set of topic nodes: "Midbrain" and "Hindbrain". As a result, the combined query from the search bar 105 and the sieve 101 is now all documents returned from the "*" query (all documents) that also contain the topics or subtopics of either "Midbrain" or "Hindbrain". This update to the query and description of the documents returned is reflected in the results description 108.

Figure 6:
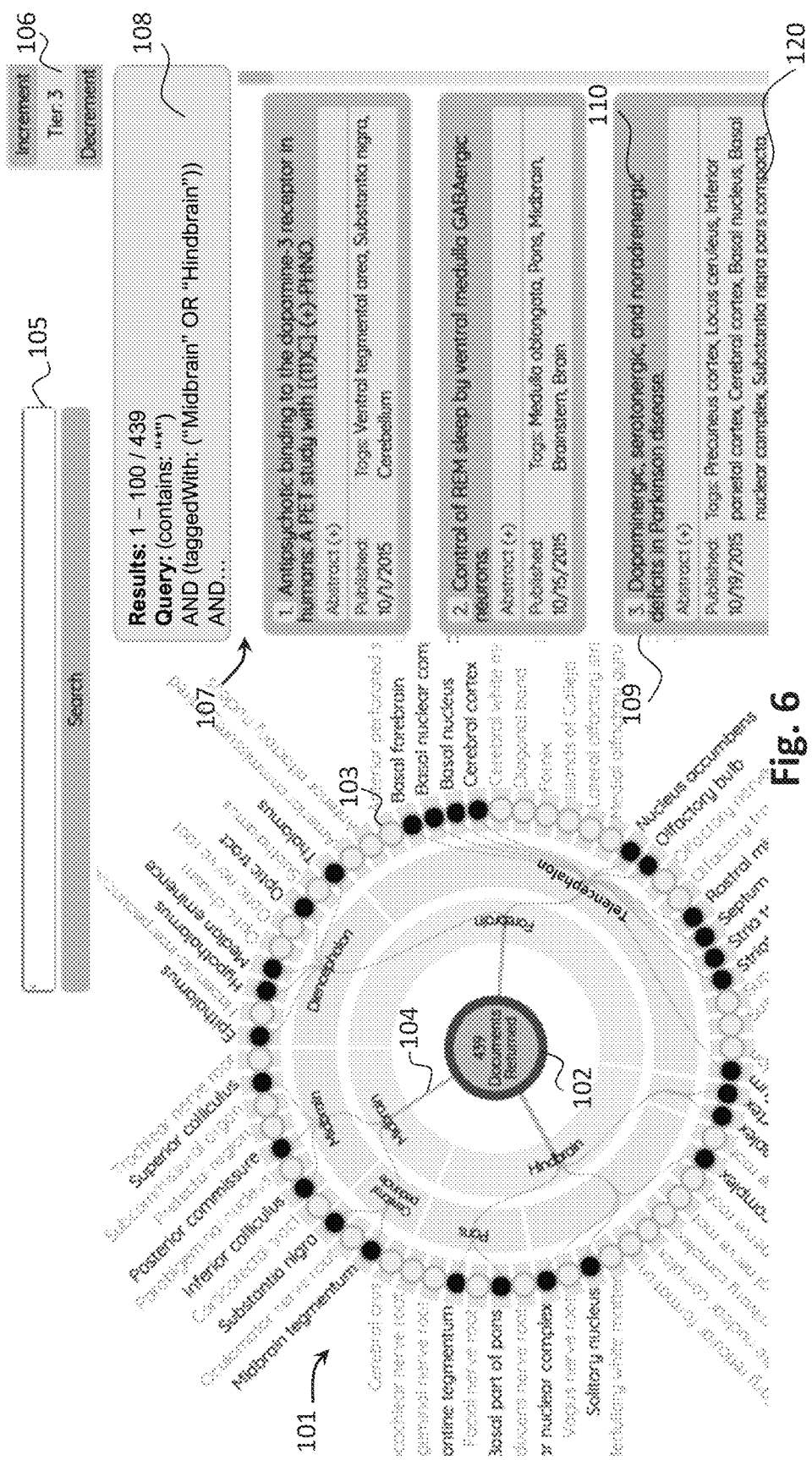
FIG. 6 is a further representation of the display of the embodiment depicted in FIG. 5, where the user has pressed shift+enter on their keyboard in order to make the document set returned in FIG. 5 become represented by the central node 102.

FIG. 6 is a further representation of the display of the embodiment depicted in FIG. 5 and has been manipulated by the user so that the previous document selection represented in the results description from FIG. 5 is now represented by the central node 102 and the distribution lines 104 displayed now describe the distribution of documents from that subset across the hierarchical topic set describing the human brain. In other words, whereas in FIG. 5 the central node 102 represented the full set of documents returned from the search query entered into the search bar 105, it now represents in FIG. 6 the document set returned from the previous sieve 101 selections. In this particular embodiment, this type of sieve 101 manipulation is triggered when the user presses the "shift" key and the "enter" key simultaneously. If this type of "deep dive" feature is implemented in the system it can be implemented in other ways as well. For example, it could have been implemented so that the central node 102 would represent the entirety of the last submitted query, including the user submitted query in the search bar 105, and not just the selected topic node portion of the previous query.

Figure 7:
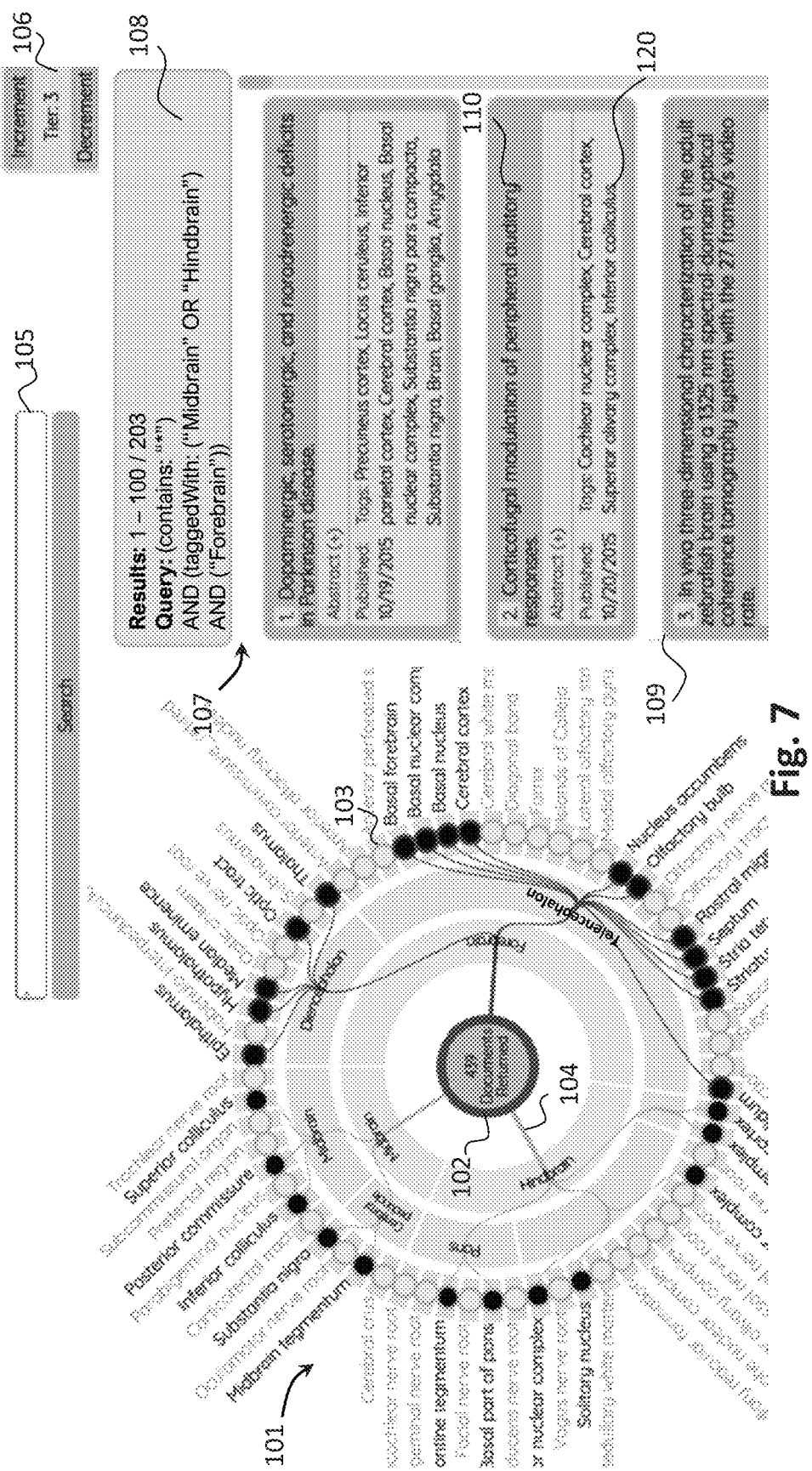
FIG. 7 is a further representation of the display of the embodiment depicted in FIG. 6, where the user has made an additional selection of "Forebrain" from FIG. 6.

FIG. 7 is a further representation of the display of the embodiment depicted in FIG. 6, and has an additional selection of "Forebrain", making the active query all documents returned from the query in the search bar 105, "*" that are related to the Midbrain, Hindbrain, or any of their subtopics, and also the "Forebrain", or any of its subtopics. In terms of Boolean logic, this can be better represented as: (documents returned from "*" query) AND (documents tagged with "Midbrain" OR "Hindbrain") AND (documents tagged with "Forebrain"). Results of this updated query are reflected in the results description 108.

Figure 8:
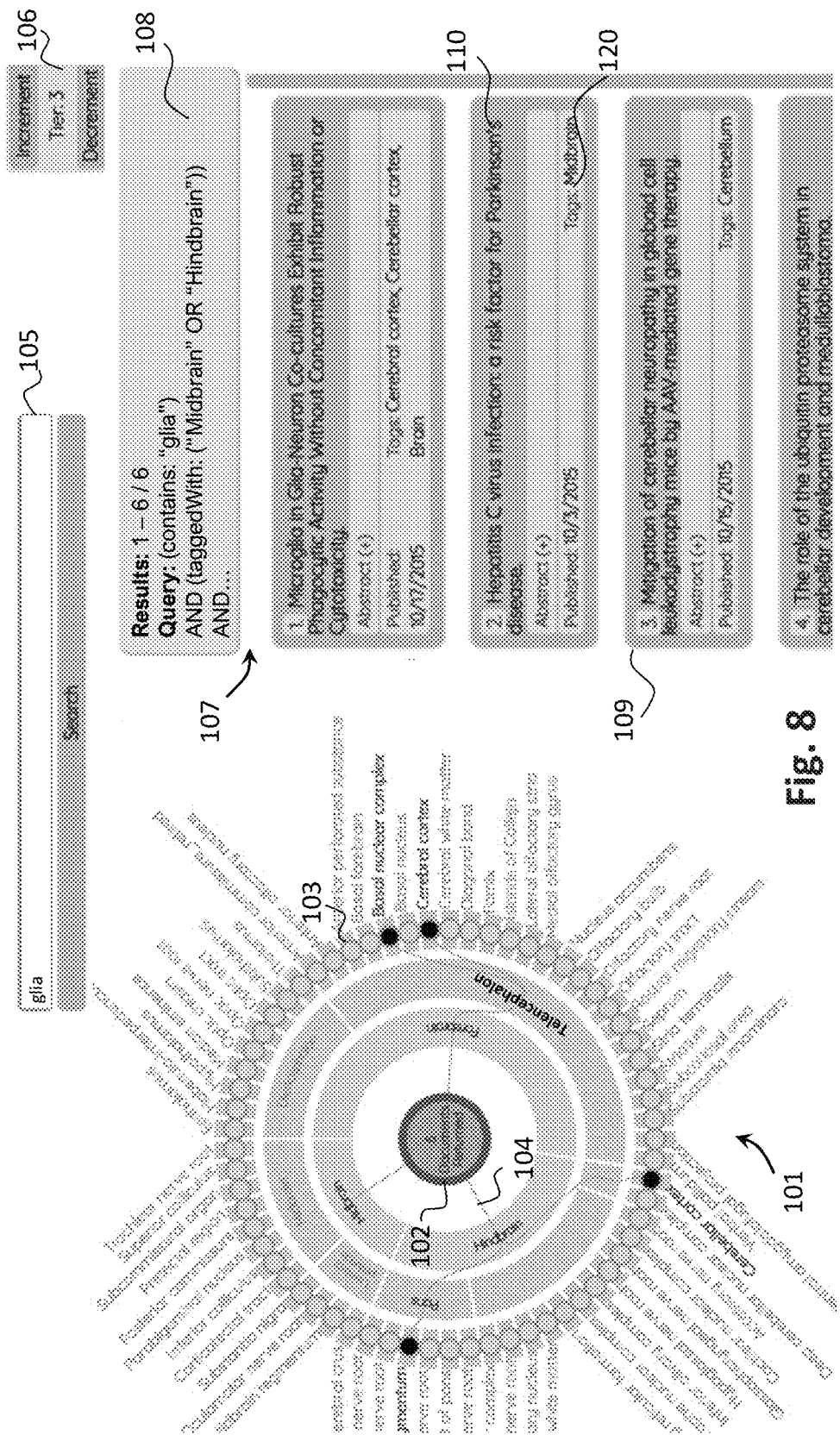
FIG. 8 is a further representation of the display of the embodiment depicted in FIG. 7, where the user has removed the "Forebrain" selection from FIG. 7 and updated the search query from "*" to "glia"

FIG. 8 is a further representation of the display of the embodiment depicted in FIG. 7, with the selection of "Forebrain" from FIG. 7 removed by clicking the central node 102, and the search query in the search bar 105 updated to "glia". Therefore, the document set retrieved from the system and displayed in the results section 107 in FIG. 8 is all documents that mention "glia" that also mention "Midbrain" or "Hindbrain", or any of their subtopics. This is reflected in the results description 108.

Figure 9:
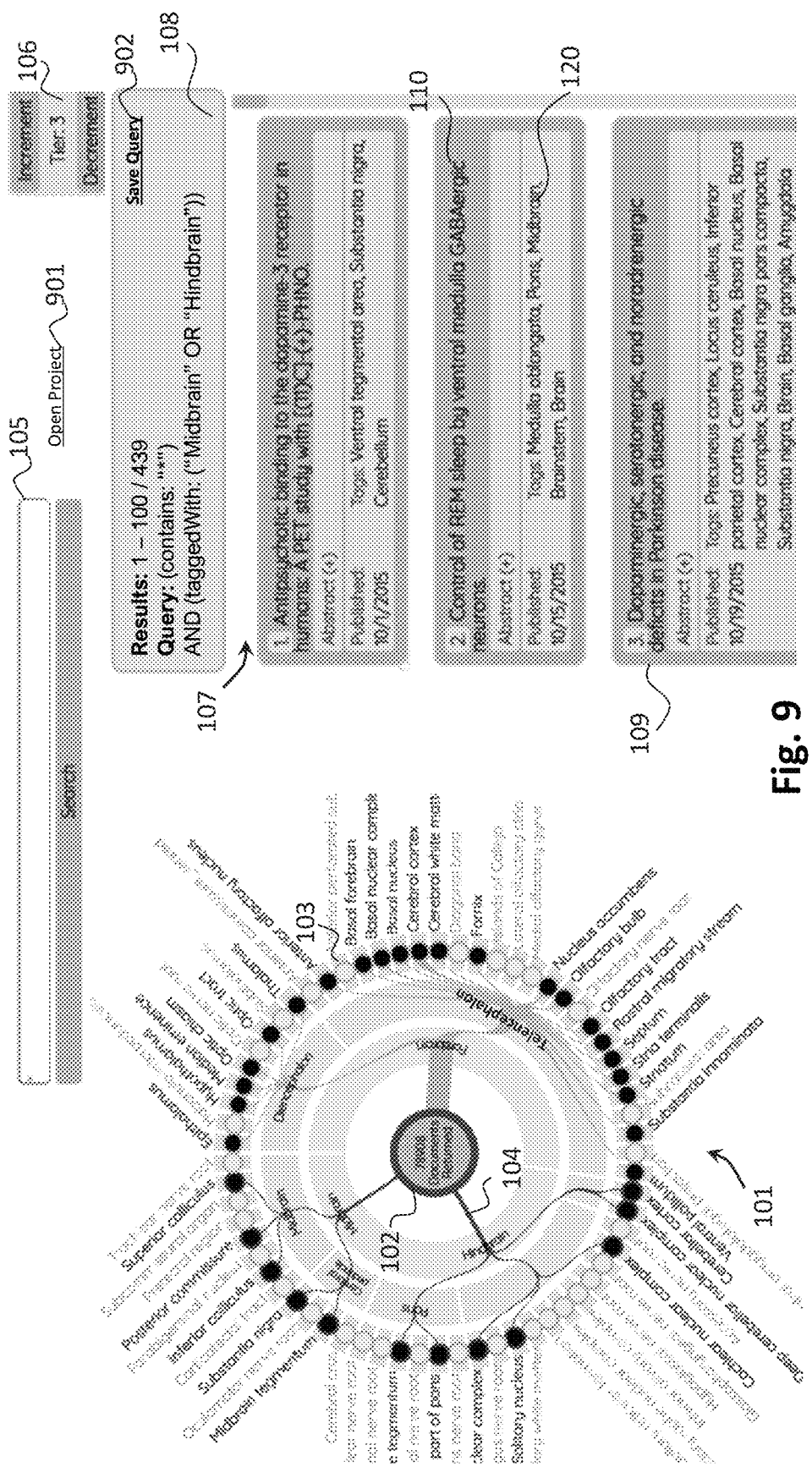
FIG. 9 depicts an embodiment of a system similar to FIG. 1-FIG. 8, except with additional features to save queries to a project for later use.

FIG. 9 is a further representation of the display of the embodiment depicted in FIG. 8, with additional features to save new queries for later use. Specifically, it features additional "Open Project" 901 and a "Save Query" 902 functionalities. Saving queries to a project allows users to combine search results from several different queries in order to create a larger collection of documents that they can then sift through with the sieve and any other filters/search features that an embodiment of the invention is implemented with. It is also one possible approach, though not the only approach, for enabling multiple queries to be combined with a Boolean logical "OR".

Figure 10:
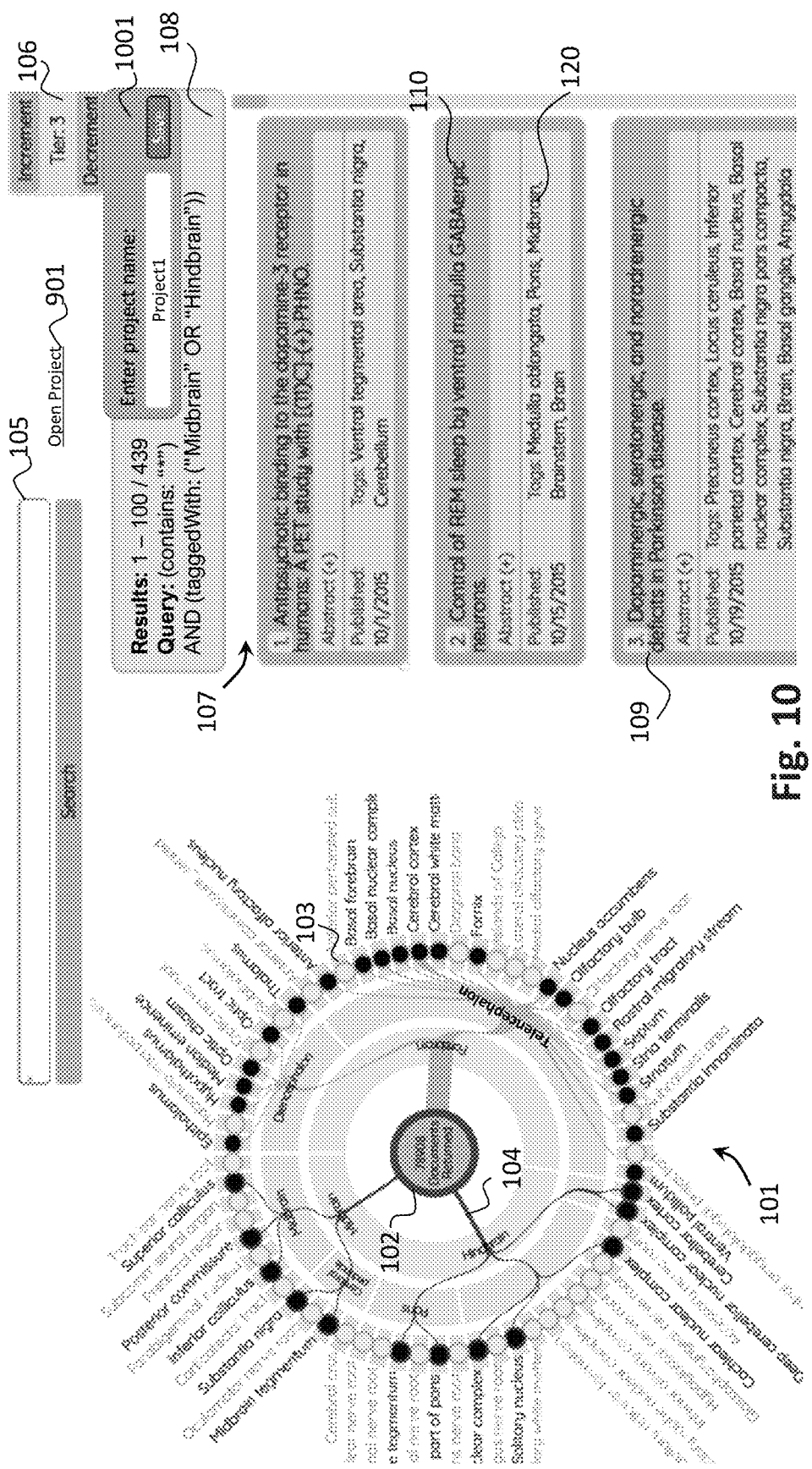
FIG. 10 is a further representation of the display of the embodiment depicted in FIG. 9, where the user is saving the active query to "Project1"

FIG. 10 is a further representation of the display of the embodiment depicted in FIG. 9, where the user is saving the active query to "Project 1", using the dialog box 1001 that appeared after the user clicked "Save Query" 902 in FIG. 9.

Figure 11:
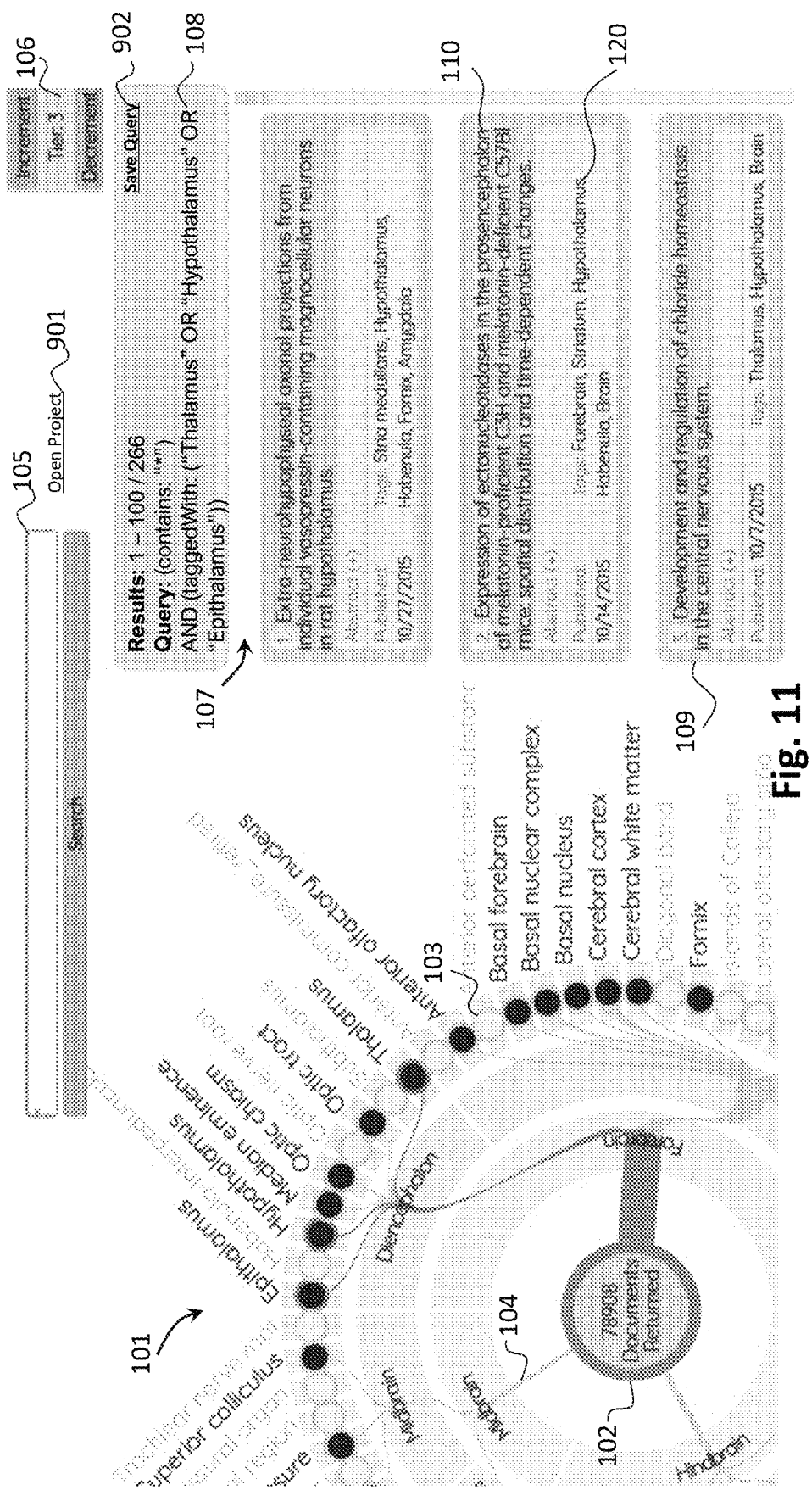
FIG. 11 is a further representation of the display of the embodiment depicted in FIG. 10, where the user has changed the active query using previously depicted methods to retrieve a different set of documents from FIG. 10.

FIG. 11 is a further representation of the display of the embodiment depicted in FIG. 10, where the user has changed the active query on the sieve 101 to retrieve a different set of documents.

Figure 12:
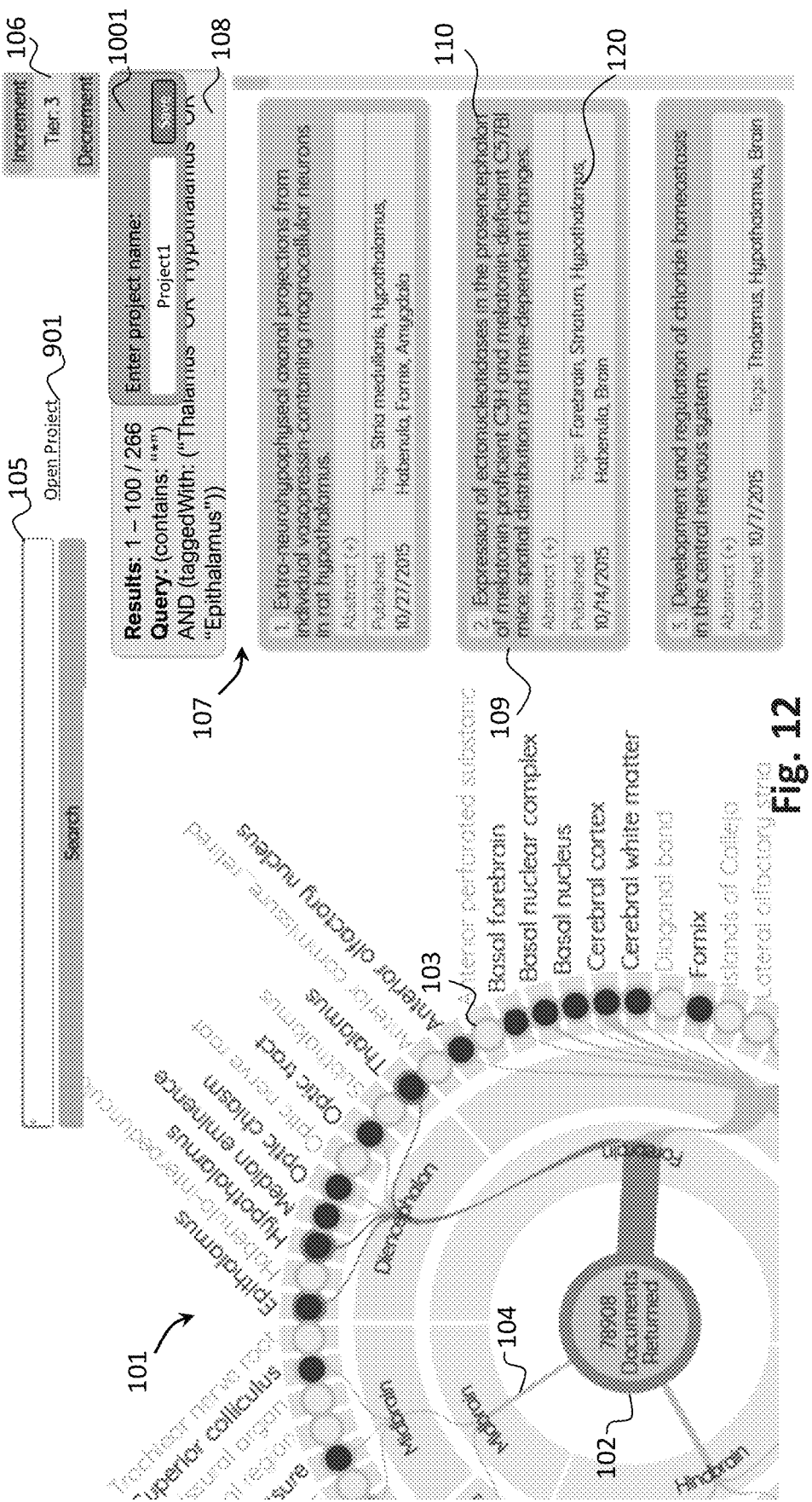
FIG. 12 is a further representation of the display of the embodiment depicted in FIG. 11, where the user is saving the active query to a project named "Project1"

FIG. 12 is a further representation of the display of the embodiment depicted in FIG. 11, where the user is saving the active query to a project named "Project1" using the dialog box 1001 that appeared as a result of the user clicking "Save Query" 902 in FIG. 11.

Figure 13:
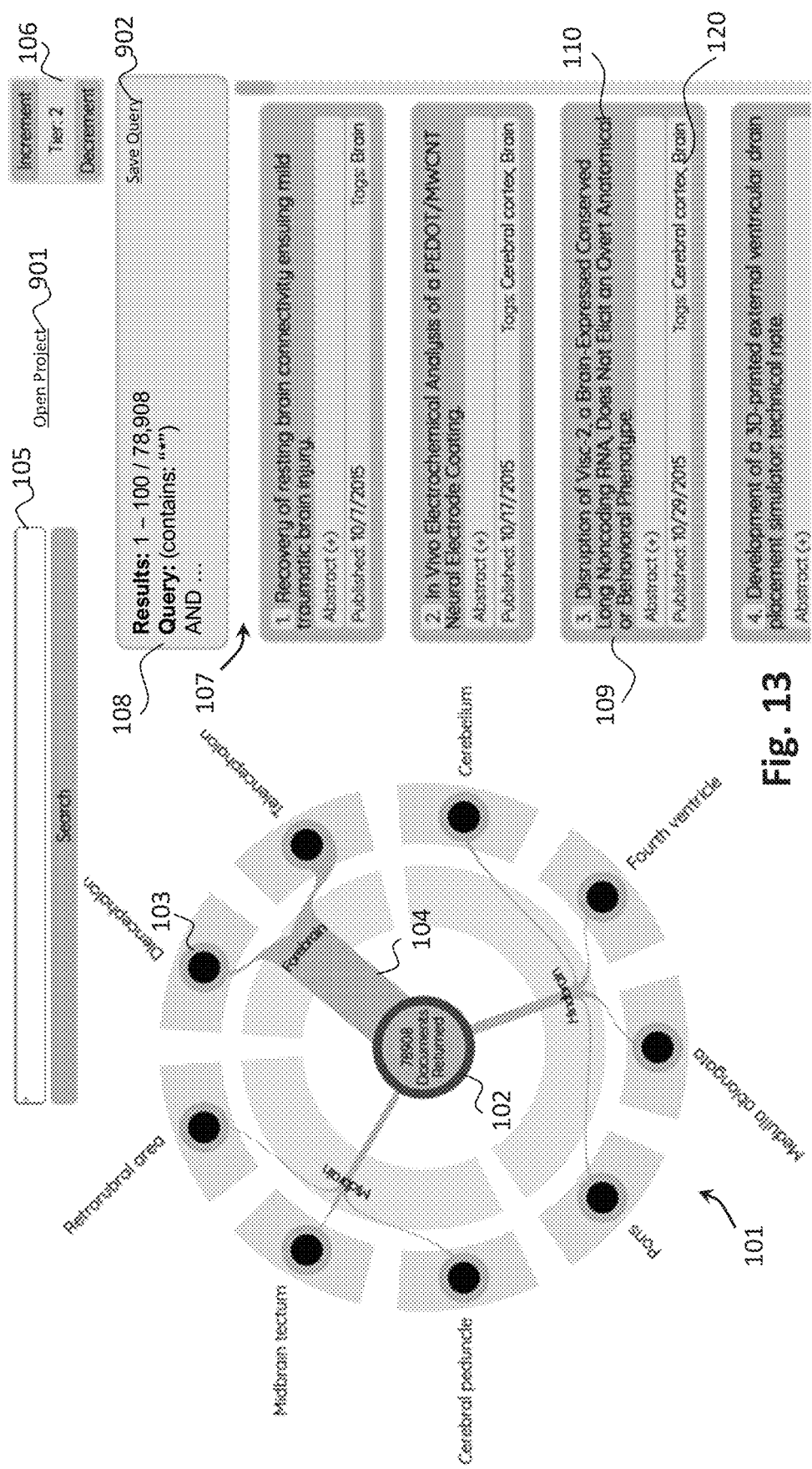
FIG. 13 is a further representation of the display of the embodiment depicted in FIG. 12, where the user is on a default, unmanipulated interface.

FIG. 13 is a further representation of the display of the embodiment depicted in FIG. 12, where the user is now on an unmanipulated, default interface. The user achieved this view into the data by selecting the central node 102 and removing the existing selections.

Figure 14:
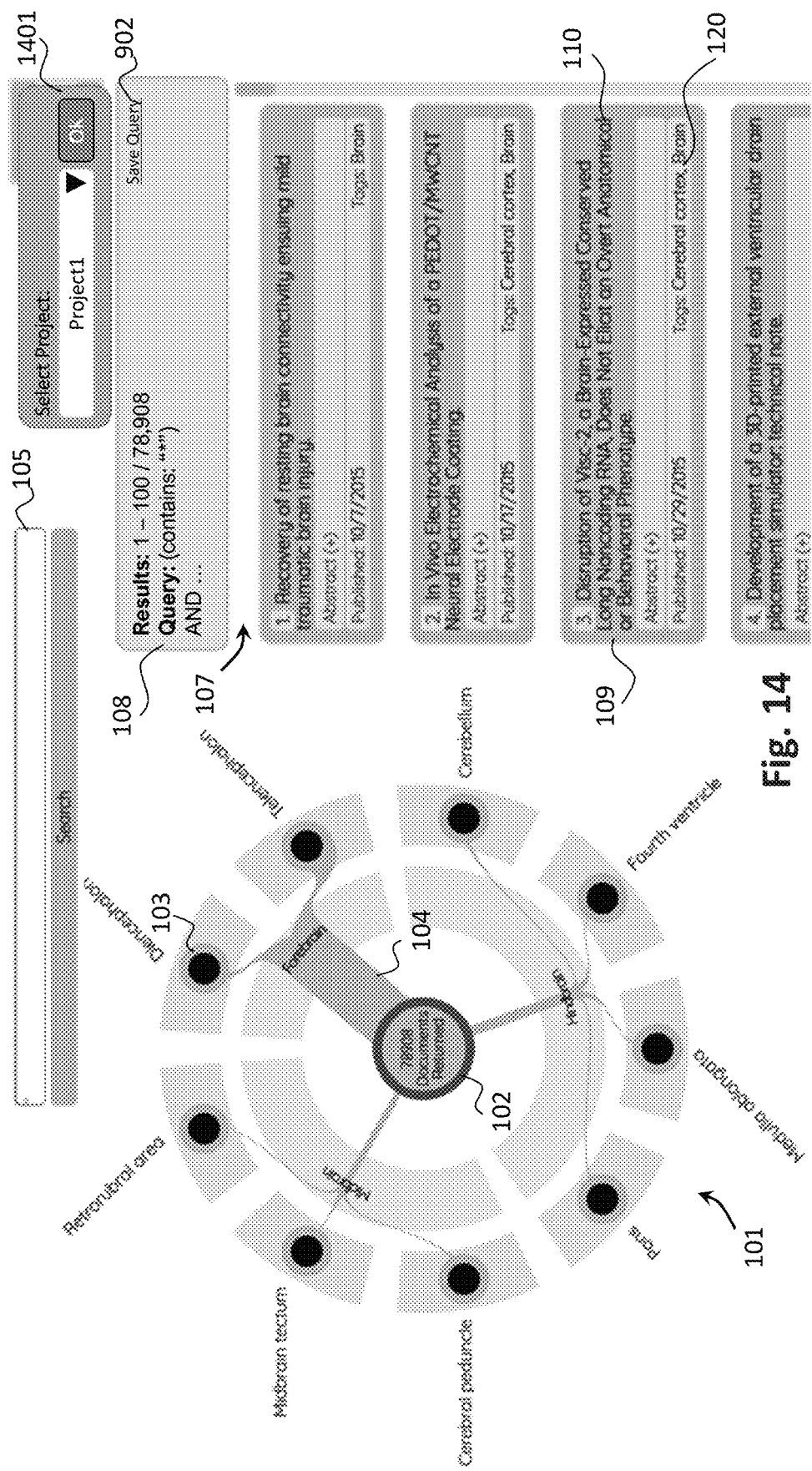
FIG. 14 is a further representation of the display of the embodiment depicted in FIG. 13, where the user is using the "open project" feature to load the collection of documents the system derives from the queries saved to "Project1"

FIG. 14 is a further representation the display of the embodiment depicted in FIG. 13, where the user clicked "Open Project" 901 in FIG. 13, causing the project dialog box 1401 to appear. If the user selects "Project 1" as shown in FIG. 14, then the system will load the set of documents created by combining the separate document sets from each of the subqueries saved to "Project 1" in FIG. 9-FIG. 10 with Boolean logic "OR". That is, it combines all of the document sets from each saved query and removes duplicates. This new document set will be then represented by the central node 102, and the distribution line 104 that is displayed will represent the distribution of search results from that new document set across the topics represented by the topic nodes 103.

Figure 15:
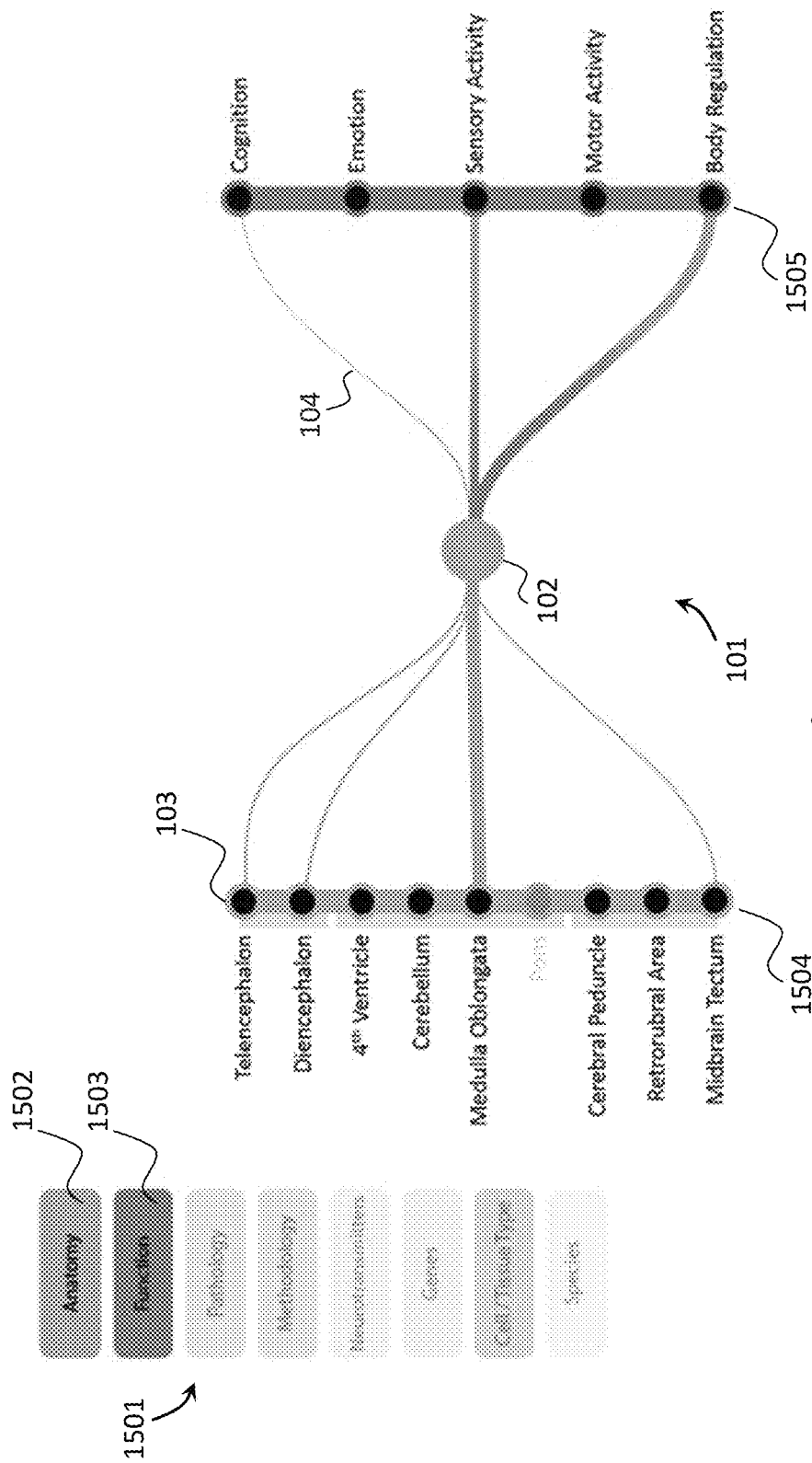
FIG. 15 depicts another embodiment of the present invention that features several distinct hierarchical topic maps that the user can choose to view individually or in combination with other hierarchical maps, and in this case the user has chosen to view the distribution of available information across maps of "human neuroanatomy" and "brain functions"

FIG. 15 depicts an embodiment of the present invention that features several distinct hierarchical topic maps that the user can choose to view individually or in combination with other hierarchical maps. In this embodiment, the user can double-click a distribution line 104 or topic node 103 to view the body of related documents on a different page. In the system state depicted in FIG. 15, the user has selected to view the distribution of available documents across maps of "human neuroanatomy" 1502 and "brain functions" 1503, using the topic map selector 1501. These maps are displayed around the central node 102 as visually separated groups of topic nodes 103, using space and color for distinction. The group of topic nodes 103 on the left 1504 represent the topic map for neuroanatomy, and the group of topic nodes 103 on the right 1505 represent the topic map for brain functions.

Figure 16:
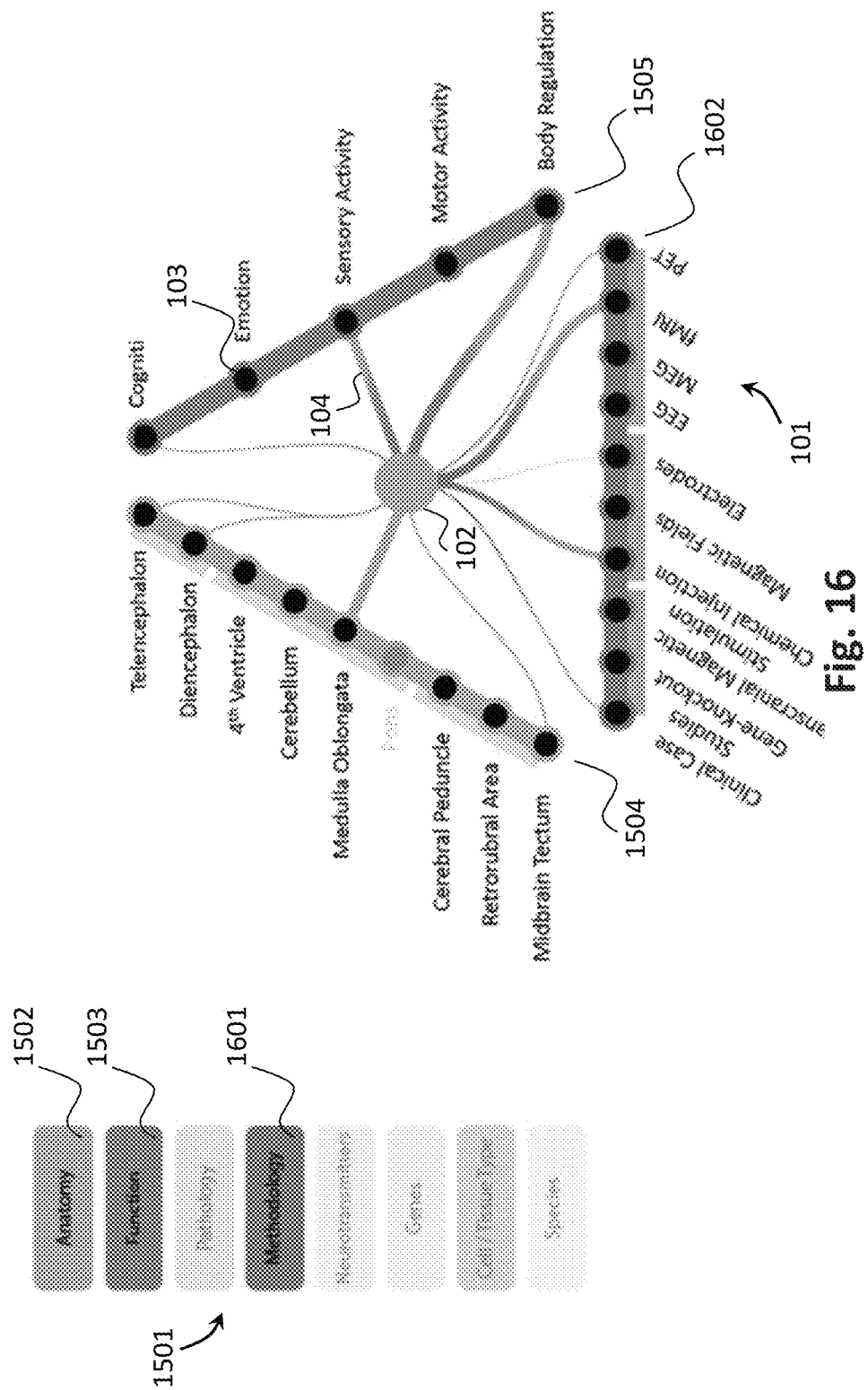
FIG. 16 is a further representation the display of the embodiment depicted in FIG. 15, where the user has elected to view the distribution of available documents across maps of "human neuroanatomy", "brain functions", and "research methodologies"

FIG. 16 is a further representation of the display of the embodiment depicted in FIG. 15, where the user has elected to view the distribution of available documents across three topic maps simultaneously, by clicking the "Methodology" button 1601 in the topic map selector 1501 in FIG. 15, causing the display of the group of topic nodes in orange 1602 that are depicted at the bottom of the sieve 101 in the interface.

Figure 17:
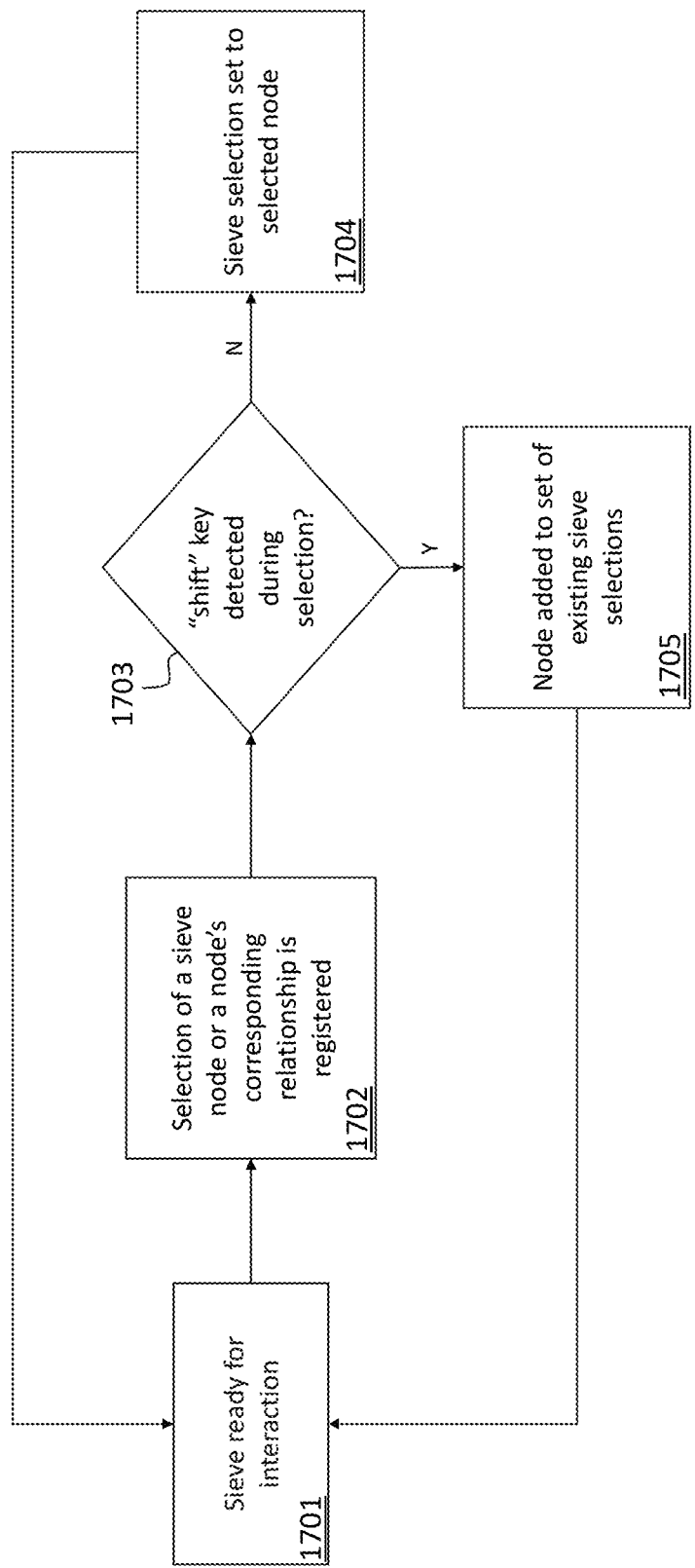
FIG. 17 is a logical flow of an embodiment of the present invention, by which the user can utilize Boolean selection criterion for multiple topic node 103 selections to be logically "OR" separated.

FIG. 17 is a logical flow of an embodiment of the present invention, by which the user can utilize Boolean selection criteria to enable multiple topic node 103, of FIG. 1, selections to be logically "OR" separated. This logical flow is not the only way this interaction can be implemented, but merely represents the implementation used in the embodiment of the invention depicted in FIG. 1-FIG. 14. In process step 1701, the system is fully loaded and ready for the user to interact with. Process step 1702 is triggered when a user selects a topic node 103 or a distribution line 104 in the sieve 101, as in FIG. 2. After the selection is registered in step 1702, the system checks if the user was holding down the "shift" key on the keyboard controlling the system in process step 1703. If the "shift" key was held, the system proceeds to step 1705 and adds the selected topic node 103 to the list of existing selected topic node 103, if any, as in FIG. 5. If the "shift" key was not held, the system proceeds to step 1704 and removes any existing topic node 103 selections before making the newly selected topic node 103 the only active topic node 103 selection. After either step 1704 or 1705 completes, the system returns to step 1701, where it is ready to record any further interactions.

Figure 18:
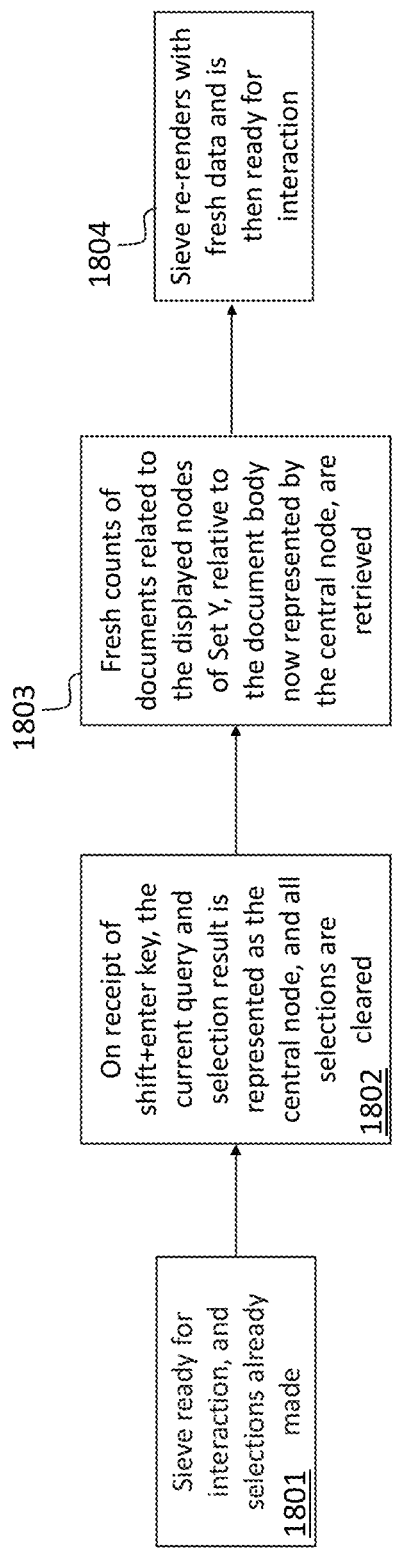
FIG. 18 is a logical flow that can be implemented in an embodiment of the invention and in combination with the logical flow depicted in FIG. 17 to enable additional Boolean selection criterion for multiple topic node 103 selections to be logically "AND" separated.

FIG. 18 is a logical flow diagram that can be implemented with the logical flow depicted in FIG. 17 for an embodiment of the present invention wherein multiple topic node 103 selections can be logically "AND" separated. This logical flow is not the only way this interaction can be implemented, but merely represents the implementation used in the embodiment of the invention depicted in FIG. 1-FIG. 14. In process step 1801, the system is ready for interaction and the user has already interacted with the system to register one or more topic node 103 selections. Then, if the system registers an "enter" key pressed while the "shift" key is also held, then the system will proceed to process 1802, taking the currently selected body of documents and making the central node 102 represent these documents and clearing any of the topic node 103 selections. The system then proceeds to process 1803 to retrieve magnitude mappings 2701 for each topic node 103 displayed that has mappings with documents in the selected document set. The system then proceeds to process 1804 and uses this new data about magnitude mappings to display new distribution lines 104 to represent the distribution of documents within that document set across the displayed topic nodes 103. Process 1804 is completed when the system has re-rendered the interface and the system is ready to receive additional user-interactions. An example of the results of this interaction can be seen in FIG. 6, relative to FIG. 5. The process steps 1801 through 1804 can be repeated as desired and as additional selections are made to enable users to continuously view the distribution of newly selected or filtered document sets across displayed topic nodes 103.

Figure 19:
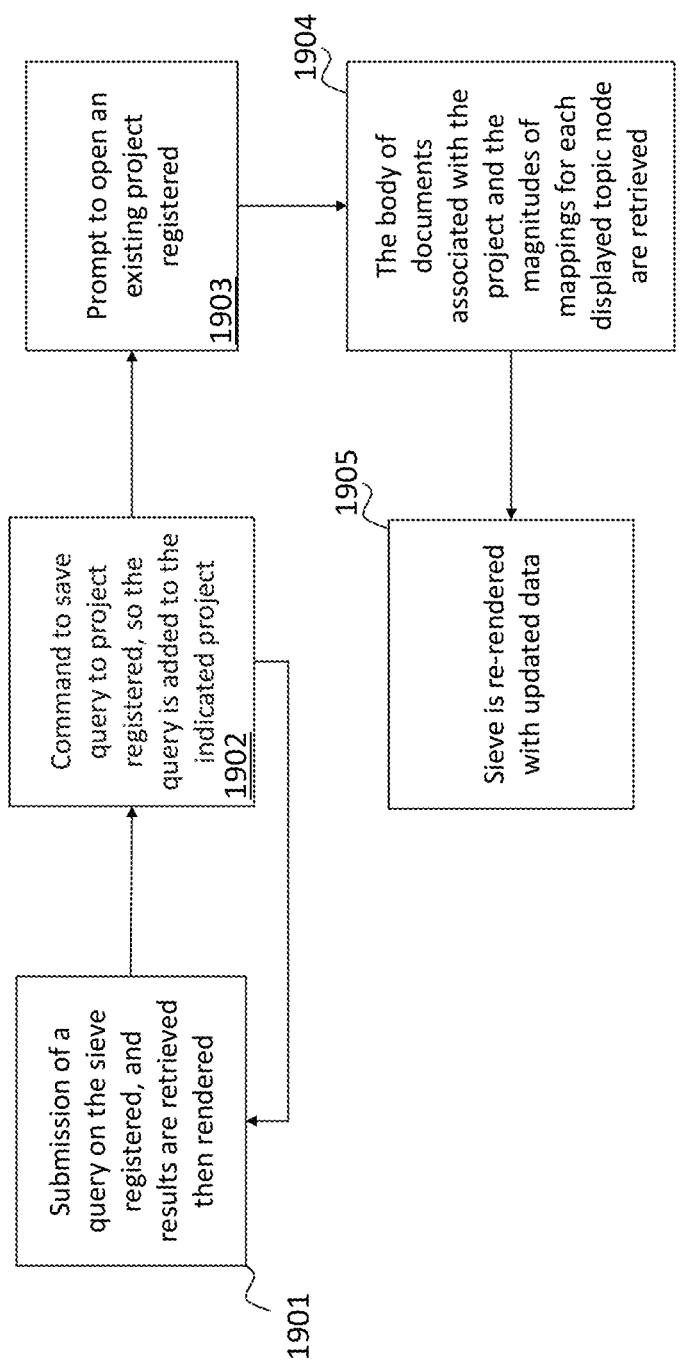
FIG. 19 is a logical flow that can be implemented in an embodiment of the invention and in addition to the logical flows depicted in FIG. 17 and FIG. 18 for opening a project with multiple saved queries in order to retrieve the cumulative set of documents represented by those queries, allowing users to separate multiple distinct queries with a logical "OR"

FIG. 19 is a logical flow diagram that can be implemented in addition to the logical flows depicted in FIG. 17 and FIG. 18, for an embodiment that enables opening a project with multiple saved queries in order to retrieve the cumulative set of documents represented by those queries, allowing users to combine the document sets retrieved from multiple distinct queries with a logical "OR". An example of a corresponding interface display for this logical flow can be seen in FIG. 9-FIG. 14. In process 1901, the system receives, processes, and renders the response from a user specified query. Process 1902 is triggered once a user indicates that they wish to add the currently displayed query to a project. Since multiple queries can be added to a project, processes 1901 and 1902 can be repeated as many times as desired. Process 1903 is triggered when the user indicates that a desire to open an existing project. Process 1903 in turn triggers process 1904, where a collection of documents is retrieved such that a document is included in the collection if it matches at least one of the queries that were added to the project. At this point any duplicate documents can be removed. The system also retrieves the magnitudes of mappings 2701. Once the requisite data is retrieved, the system proceeds to process 1905, where the interface is re-rendered with the new document set and magnitude data, used for the distribution lines 104.

Figure 20:
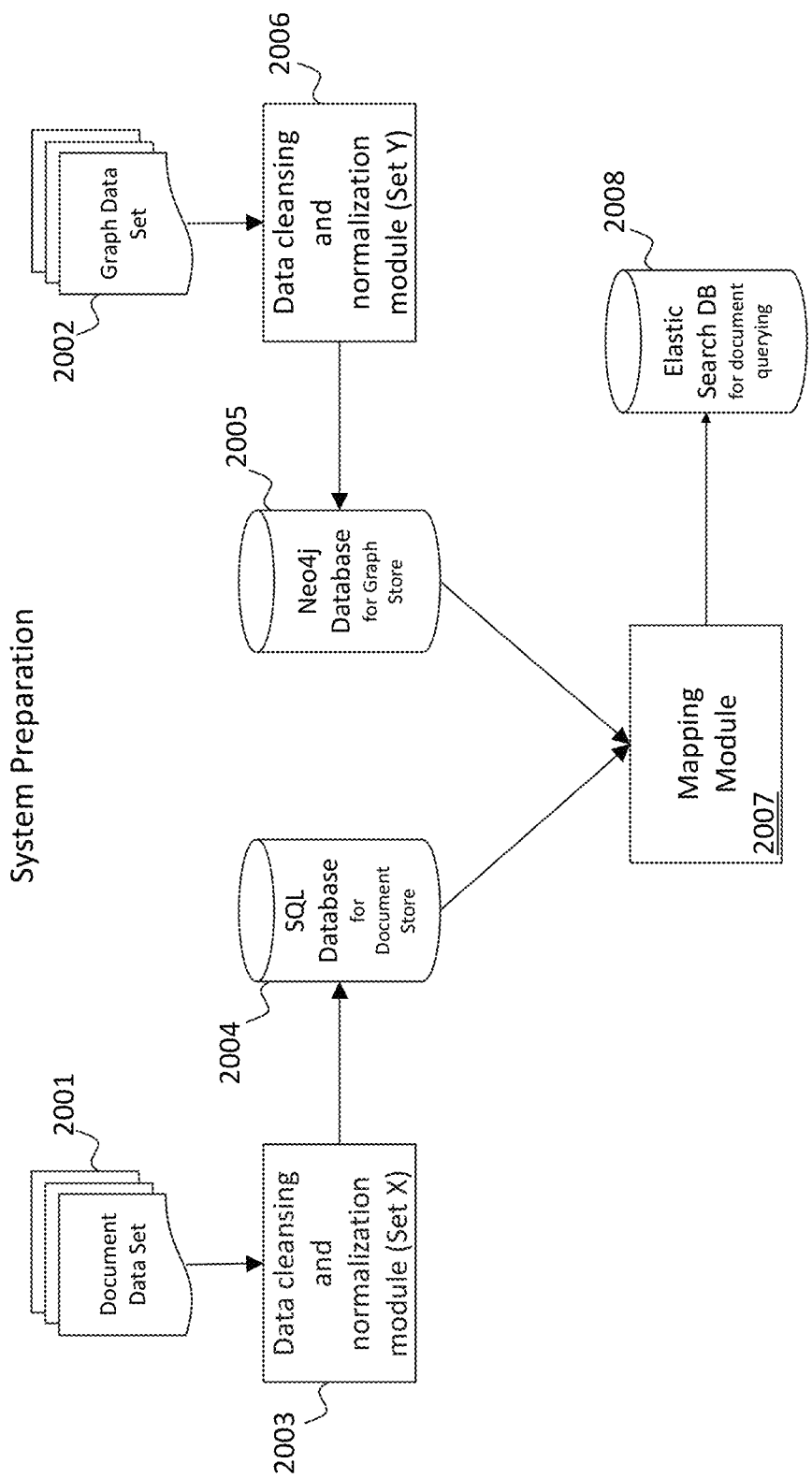
FIG. 20 is a block diagram showing, at a high-level, a suitable architecture of the infrastructure and modules necessary to set up and prepare the system and data objects for operation in one embodiment of the invention.

FIG. 20 is a block diagram showing, at a high-level, a suitable architecture of the infrastructure and modules necessary for a particular embodiment of the invention to set up and prepare the system and data objects for operation. Block 2001 represents the document data objects of the set X, which may come from any variety of sources. The purpose of the Data cleansing and normalization module 2003 for set X is to ensure all data has the consistent and desired formatting necessary for the embodying system to operate with it. Once the data is prepared according to the designed specification for the implementing system of the embodiment, the data is stored for later use, such as by storing it in a document database 2004 of some kind, such as SQL. Graph data set 2002 is a raw form of the set Y, related data objects. The purpose of the Data Cleansing and Normalization Module 2006 for Set Y is to prepare the set of related objects for use in accordance with operation of the system. The exact implementation and functions of this module will vary depending on the data 2002 that is provided as an input. However, the output should be hierarchical or heterarchical data with no loops. The module can be either an automated process, manual process, or a combination of both as is necessary to normalize the data inputs. Once normalized, the hierarchically related data of set Y 2002, output from the normalization module 2006, is stored for later use. Any suitable data storage mechanism will suffice, though the embodiment depicted utilizes a Neo4j graph database store 2005. Once the data sets X and Y are prepared and stored, the mapping module 2007 takes these data sets as inputs for its processes that determine which objects in set X should have mappings to specific objects in the set Y. The criteria for determining whether a mapping should be made is arbitrary and will vary depending on the system's needs. In the embodiment of the invention depicted, a mapping is generated for a document in the set X if a topic from the set Y is mentioned in a document in the set X. Once the mappings are generated, they are stored for later access. Any suitable mechanism of data storage and access is sufficient, such as, for example, the Elasticsearch database 2008. The documents from the set X are stored in the database 2008 and indexed with their mappings, which in the embodied system are topics from the set Y that the documents were found to be related to in the mapping module.

Figure 21:
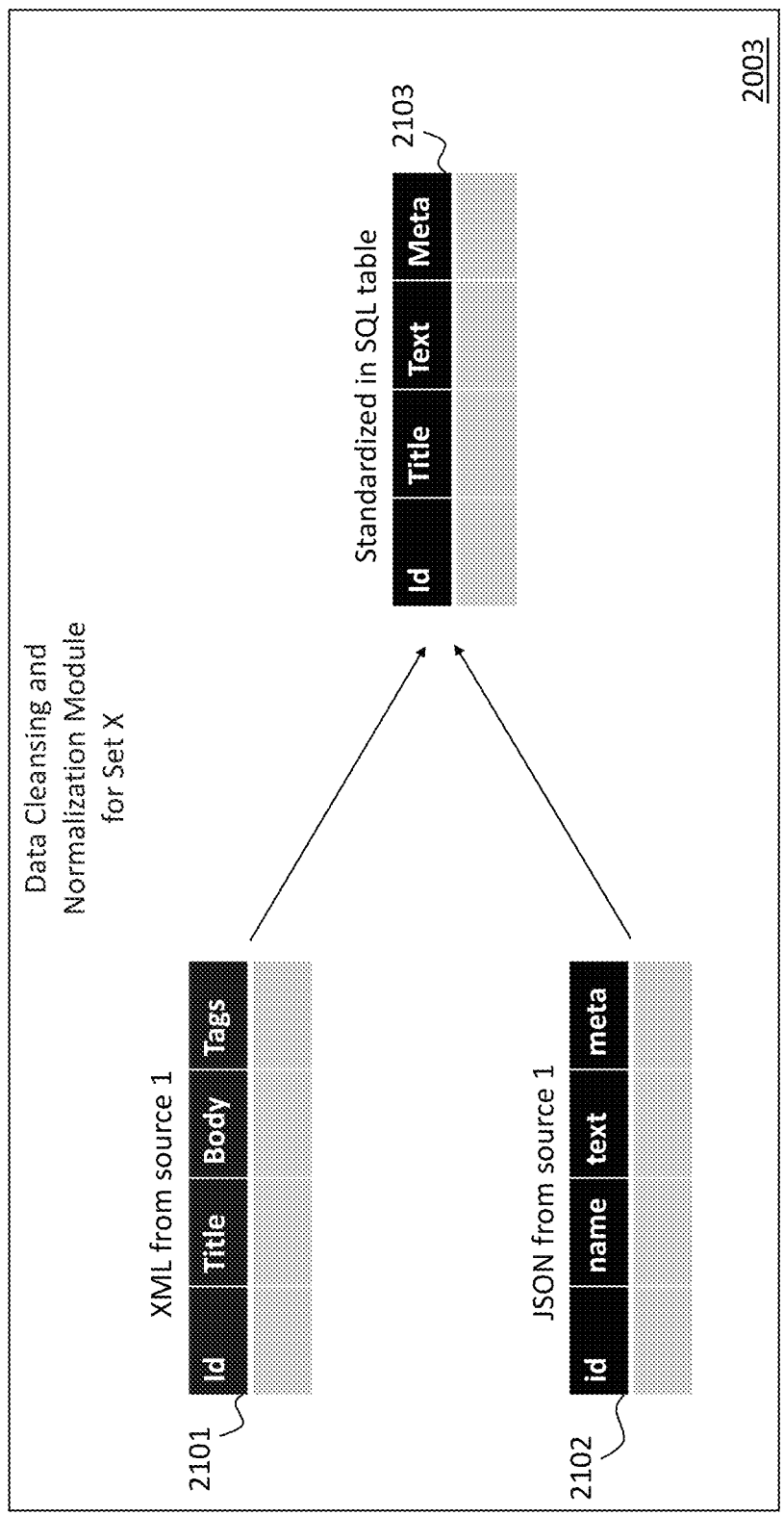
FIG. 21 depicts an example input and output of the data normalization process for a collection of document data objects from different sources and with different formatting, in accordance with an embodiment of the present invention.

FIG. 21 depicts an example input and output of the data normalization process for a collection of document data objects from different sources and with different formatting, in accordance with the embodiment of the present invention in FIG. 20. Headers 2101 and 2102 are tabularized headers of sample XML-formatted document-based data from two different sources and with two different kinds of formatting. The embodied system in this example, utilizes data from both sources, and so the data must be normalized so that both have consistent headers for later access and querying. If a system only uses information from a single source and reformatting of the data is not necessary, this module may be omitted.

Figure 22:
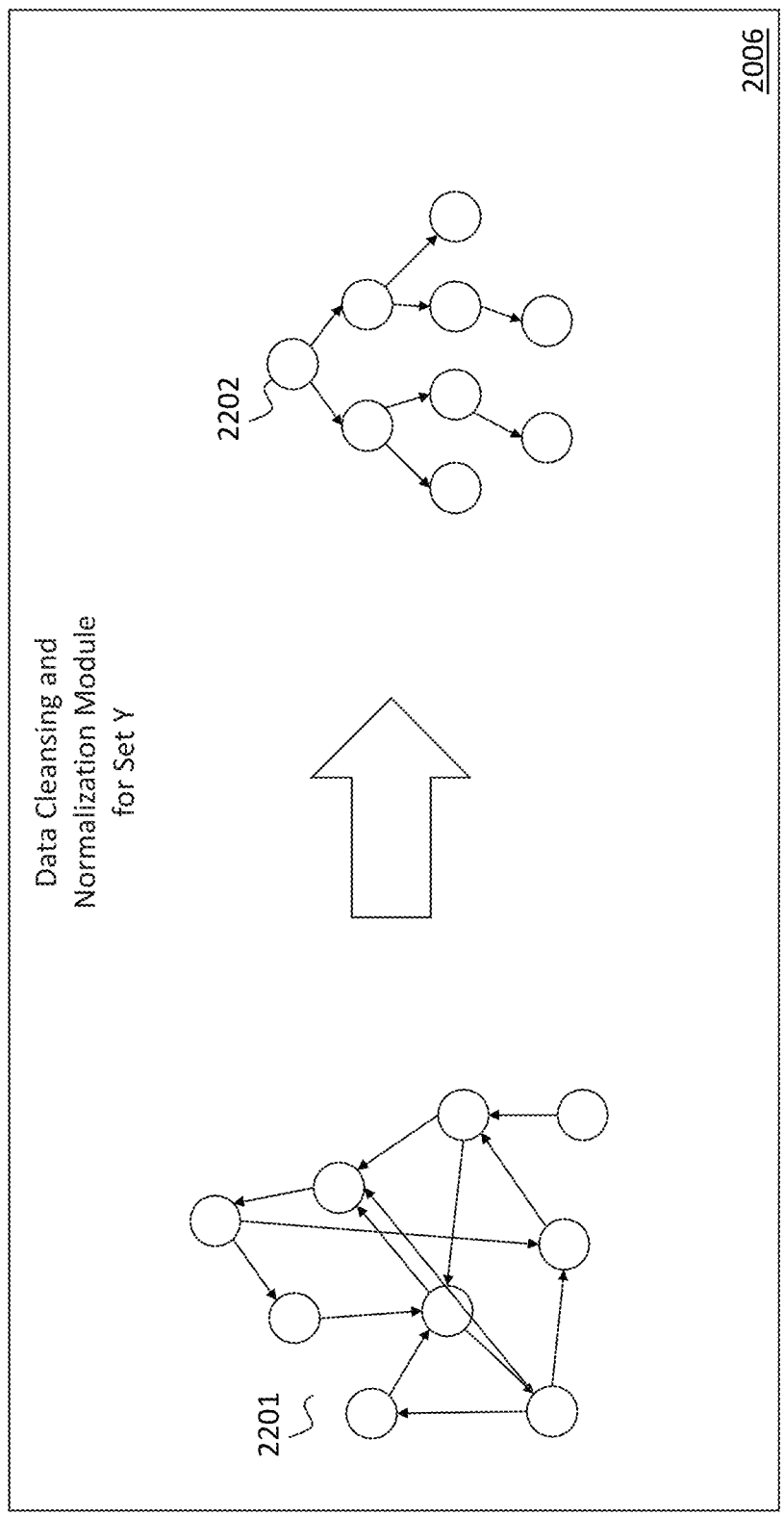
FIG. 22 depicts an example input and output for the data normalization process, in accordance with an embodiment of the present invention, to produce a hierarchically related set of data objects that represent topics.

FIG. 22 depicts an example input and output for the data normalization process, in accordance with the embodiment of the present invention in FIG. 20, to produce a hierarchically related set of data objects that represent topics. Item 2201 is a connected graph data object representing a variety of relationships between the topics contained within the graph. Embodiments of the present the invention are well suited for use with hierarchical or heterarchical related data objects. As such, the purpose of this module is to ensure that the data consumed by the system is either hierarchically or heterarchically related, and has no direct or transitive loops between data objects. If any of these circumstances is determined to be present, automated and/or manual methods can be used to address them, as suited to the needs and capabilities of the embodying system and environment. If an embodiment of the invention does not utilize graph data inputs, and instead generates hierarchies from scratch, then this module is not necessary.

Figure 23:
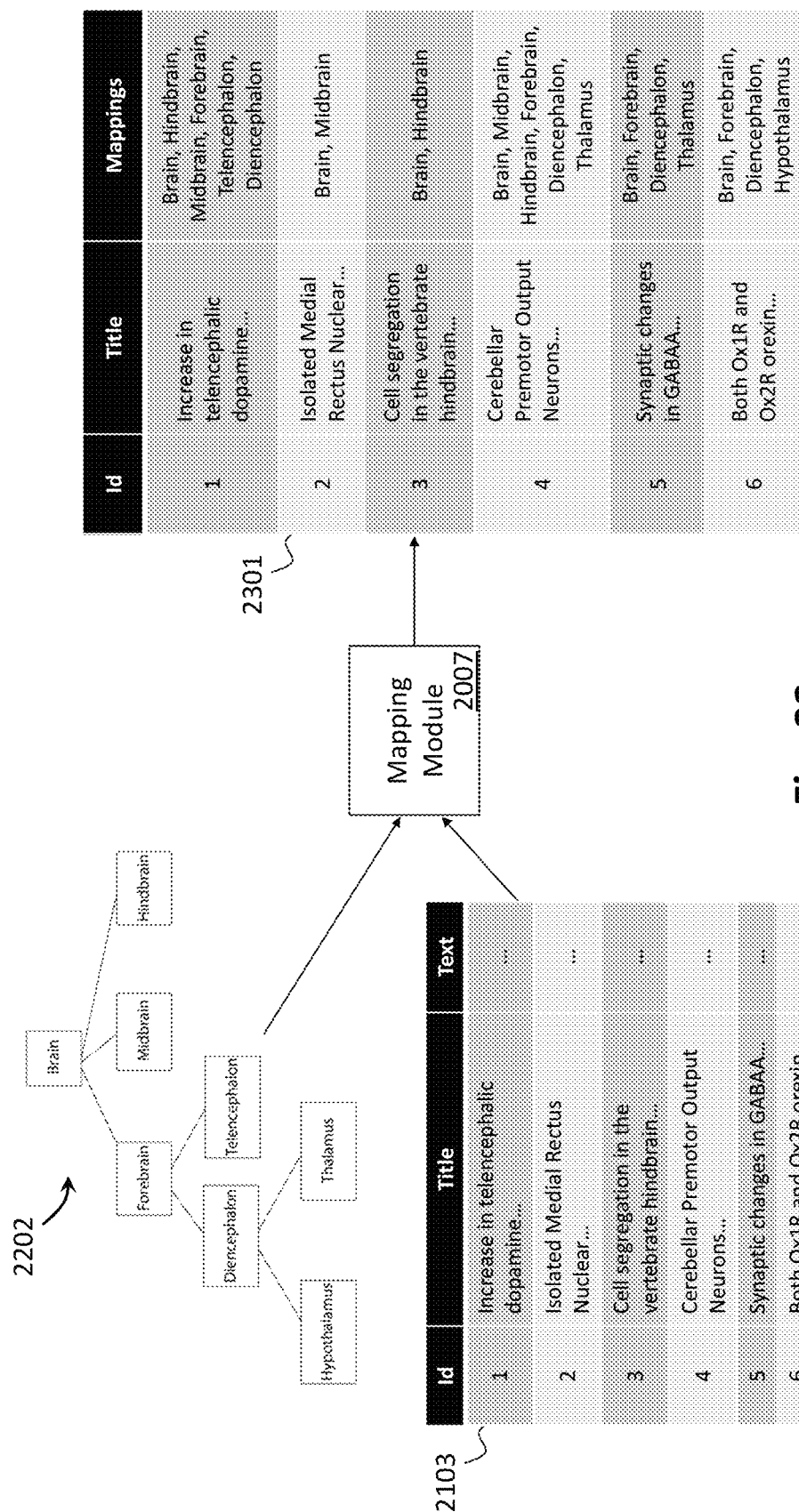
FIG. 23 depicts an example of input and output data objects for the mapping module in an embodiment of the invention that will produce a mapping between a first set of document data objects 2103 of FIG. 21, and a second set of hierarchically related data objects representing topics 2202 of FIG. 22.

FIG. 23 depicts an example of input and output data objects for the mapping module 2007 in FIG. 20, from an embodiment of the invention that will produce a mapping between a first set of document data objects 2103 of FIG. 21, and a second set of hierarchically related data objects representing topics 2202 of FIG. 22. The criteria by which a mapping is made between members of the first and second of objects 2202 and 2103 are arbitrary but should be consistent and quantifiable. For example, the embodiment of FIG. 23 creates a mapping for a document in 2103 if a topic in 2202 is mentioned in the title or text of a document. The output of the mapping module 2007 is represented in the tabular data representation 2301, and depicts how the documents of 2103, stored in the SQL database 2004, are updated with a new column, "Mappings", which contains all the topics from 2202 that were found to be mapped to the documents. Note that 2301 still retains additional fields like "Text" in 2103, but they are simply not depicted in the figure. In the embodiment depicted, the updated Set X 2301 is then stored in a search database like Elasticsearch, though any other sufficiently query-able system is suitable as well. The quantifiable metric in this embodiment will be the number of documents each topic is mentioned in.

Figure 24:
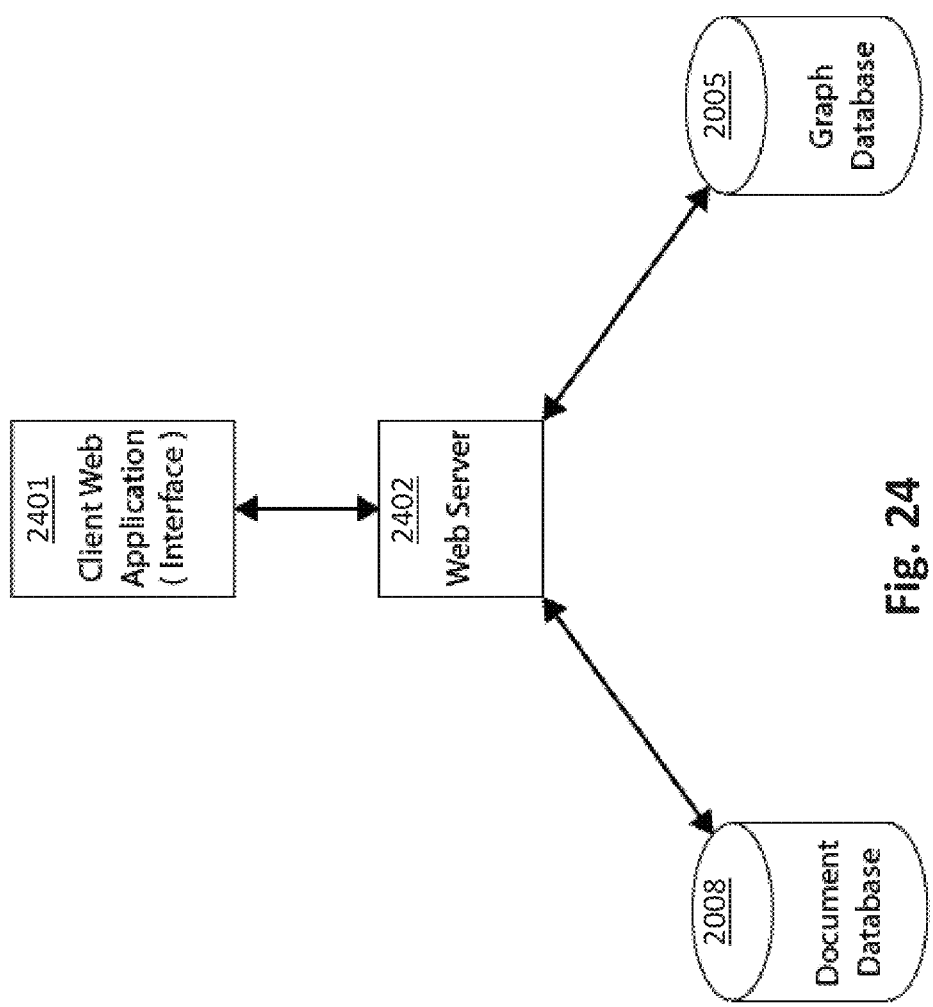
FIG. 24 depicts system architecture, for an embodiment of the invention that is accessible via the internet, using a client-server architecture.

FIG. 24 depicts system architecture for an embodiment of the invention that is accessible via the internet, using a client-server architecture. Any suitable architecture that enables the prepared data to be effectively queried and processed to perform the functions and capabilities outlined in this patent is suitable. In the embodiment depicted, the client web application 2401 is running in a browser on a user's computer. The web application 2401 is in communication over the internet with web server 2402, which may be hosted privately, locally, in the cloud, or any other suitable hosting mechanism that enables communication via networks such as the internet. The web server 2402, in turn is coupled to document database 2008, containing documents with mappings 2301, and graph database 2005, which contains the hierarchically or heterarchically related data objects 2202 utilized by the system.

Figure 25:
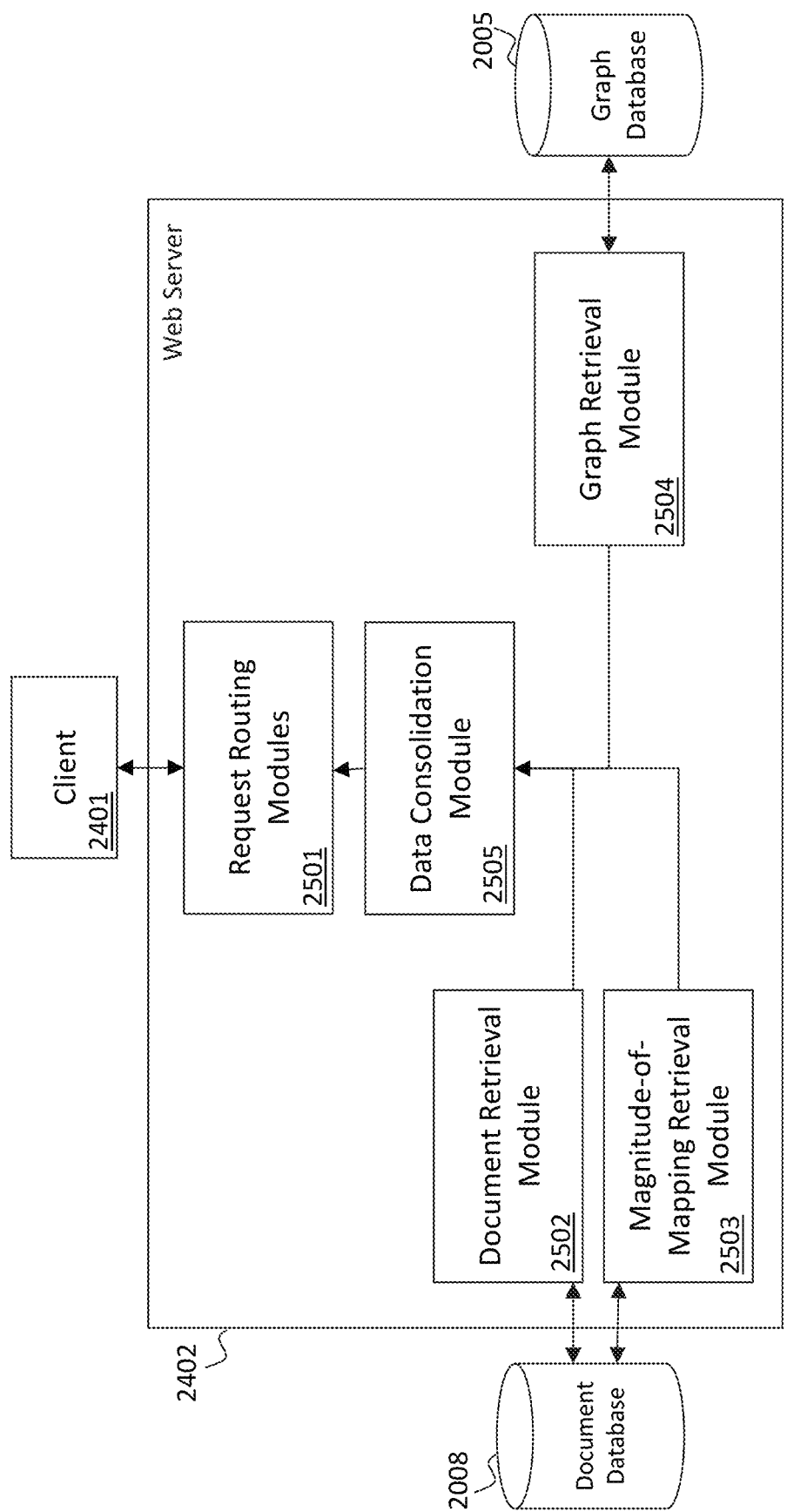
FIG. 25 is a block diagram, of an embodiment of the present invention, showing the modules utilized in implementation of the server application 2402 of FIG. 24, which communicates with the client application 2401, the document database 2008, and graph database 2005.

FIG. 25 is a block diagram of an embodiment of the present invention, showing the modules utilized in implementation of the server application 2402 of FIG. 24, which communicates with the client application 2401 and the document database 2008 and graph database 2005. The Request Routing Modules 2501 are responsible for receiving requests from the client application, orchestrating their processing, and sending responses. The Document Retrieval Module 2502 and Graph Retrieval Module 2504 are responsible for communicating with the databases to get the data objects necessary to fulfill the client request. The Magnitude-of-Mapping Retrieval Module 2503 is responsible for quantifying the mappings that are found in the retrieved documents and providing a magnitude for each type of mapping, if the capability is not included in the database itself. The Data Consolidation Module 2505 is then responsible for integrating the data retrieved from the variety of sources so that the Request Routing Module 2501 can respond with the appropriate data payload.

FIG. 26 is a visual representation of example inputs and output data of an embodiment of the recommended "Magnitude-of-Mapping Retrieval Module" 2503 of FIG. 25. When a query for documents is issued to the server and documents are retrieved in process 2301, the mappings must be quantified for each topic in the system that had a mapping determination made against the set X. An example output is depicted in 2601, where for each possible mapping type, or topic, the number of times the mapping appeared in the result set is totaled. This is not the only way to quantify the mappings, but simply the approach implemented in this particular embodiment of the invention. Any sensible quantification that is suitable to the aims of the embodying system may be implemented.

Figure 27:
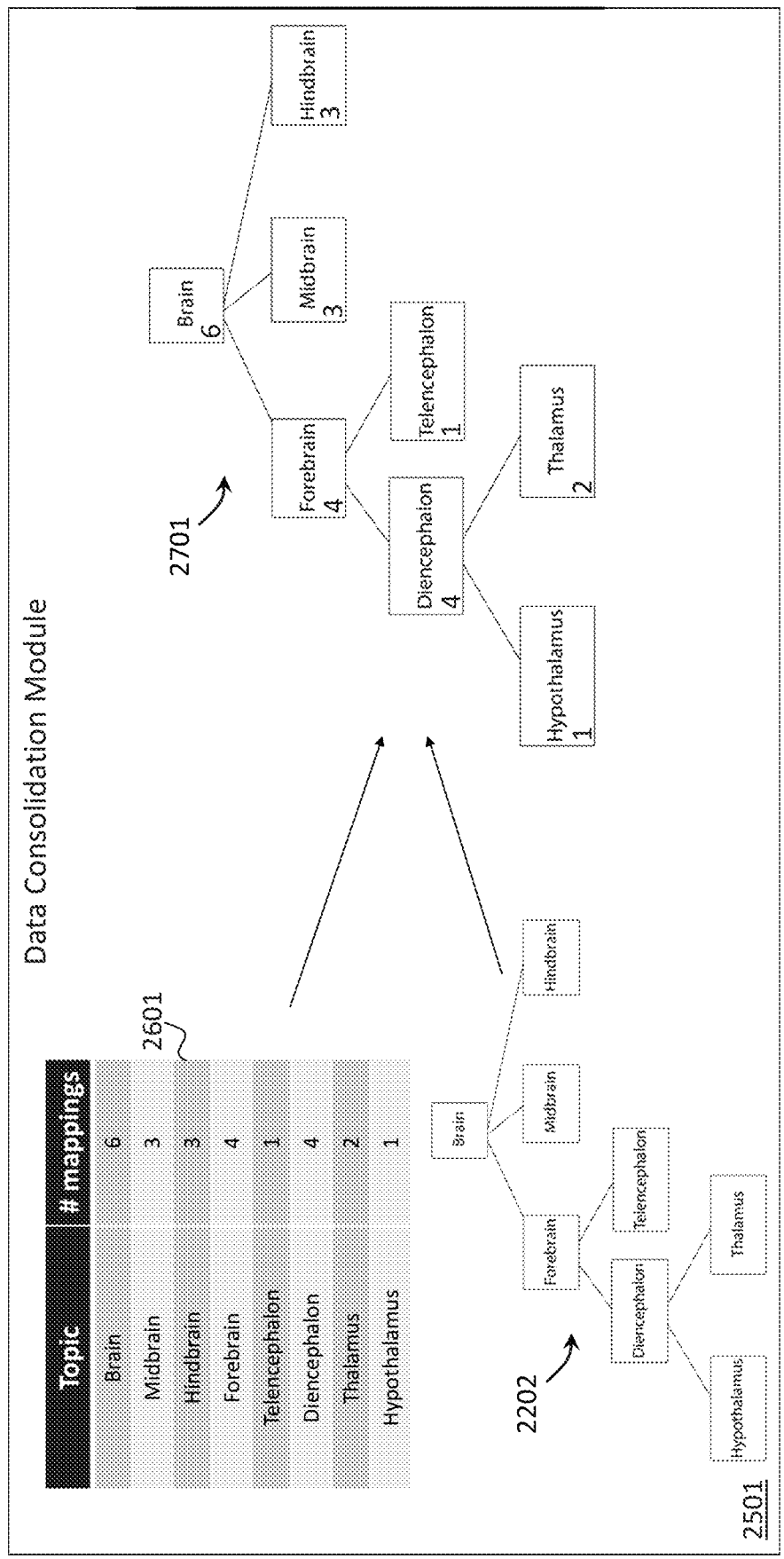
FIG. 27 depicts abstract representations of example inputs and outputs of an embodiment of the "Data Consolidation Module" 2505 of FIG. 25, which combines the magnitudes of mappings output 2601 with the set of hierarchically related topics 2202.

FIG. 27 depicts abstract representations of example inputs and output of an embodiment of the "Data Consolidation Module" 2505 of FIG. 25, which combines the magnitudes of mappings output 2601 with the set of hierarchically related topics 2202. The data need not be integrated in this way, but rather this module is presented and visualized in this manner to better help the reader understand how the system data is combined for later use in rendering.

Figure 28:
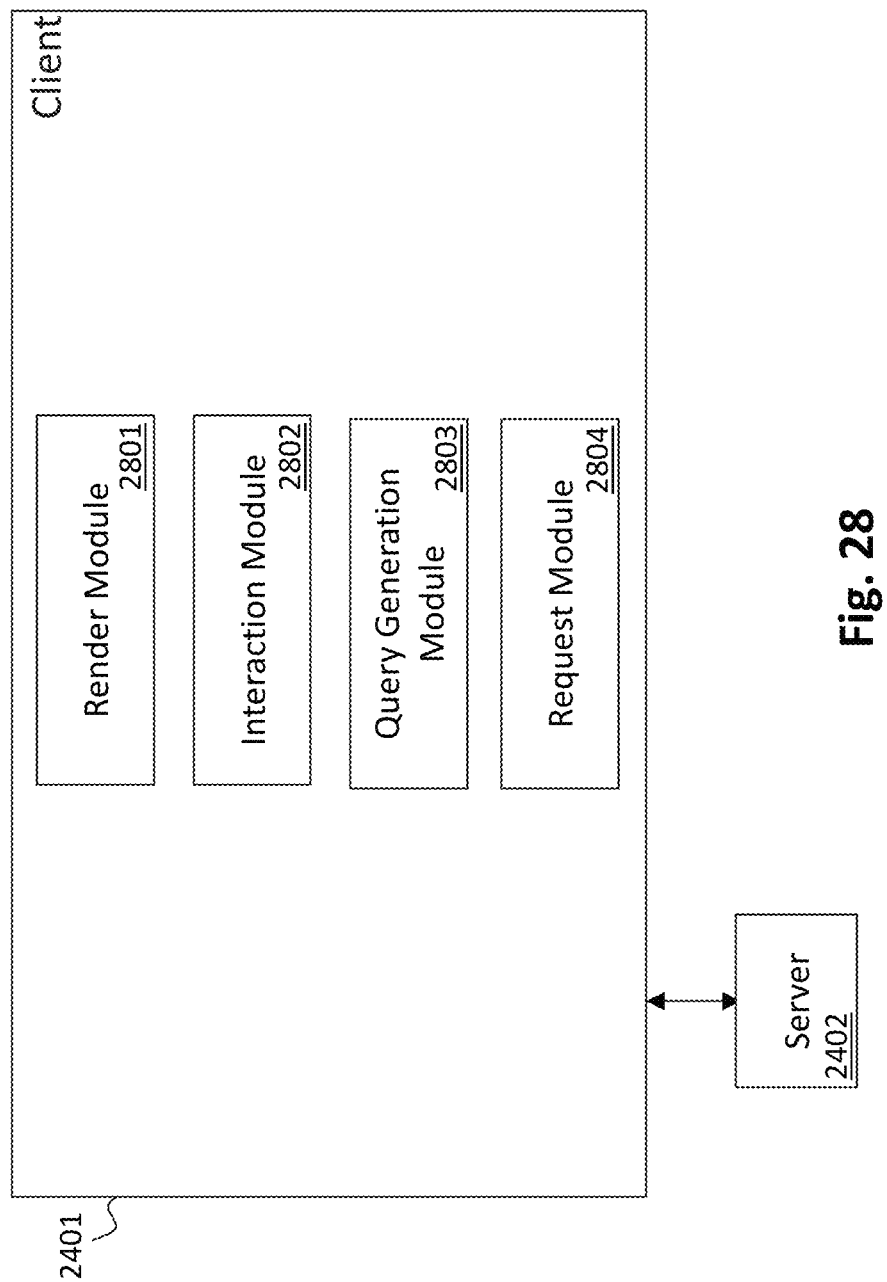
FIG. 28 is a diagram, in accordance with an embodiment of the present invention, that shows modules for use in implementation of the client application 2401 of FIG. 24.

FIG. 28 is a diagram, in accordance with an embodiment of the present invention, that shows modules for use in implementation of the client application 2401 of FIG. 24. The Render Module 2801 utilizes system data to build the display that the user sees. The Interaction Modul 2802 integrates with the rendered display and programs interactive capability so the user can interact with the system. The Query Generation Module 2803 maintains and tracks data that is necessary for query generation and passes it to the Request Module 2804, which maintains communication with the application server 2402, when requests are made for new query responses.

Figure 29:
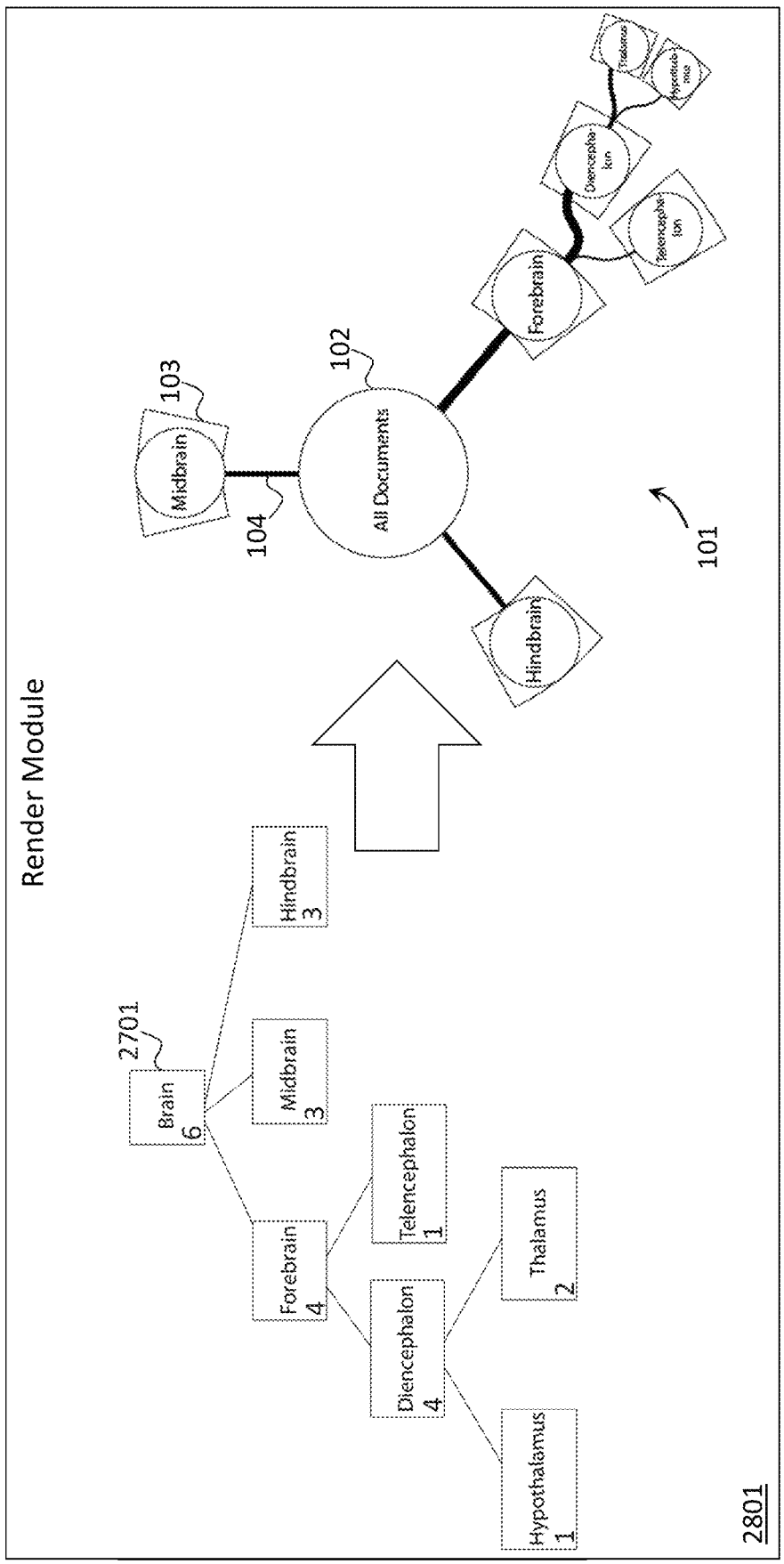
FIG. 29 depicts a first manner by which the consolidated data 2701 are rendered by the render module 2801 of FIG. 28 in an embodiment of the present invention.

FIG. 29 shows an embodiment of a rendering by the Render Module 2801 of FIG. 28 as a result of processing the consolidated data 2701 of FIG. 27, in which the hierarchically related topics in 2701 are utilized to render topic nodes 103. The magnitudes associated with each topic in 2701 are used to determine the width of the distribution lines 104. The central node 102 represents all documents returned from a submitted query, and one or more higher-tier topic nodes in 2701 are excluded from the rendering.

Figure 30:
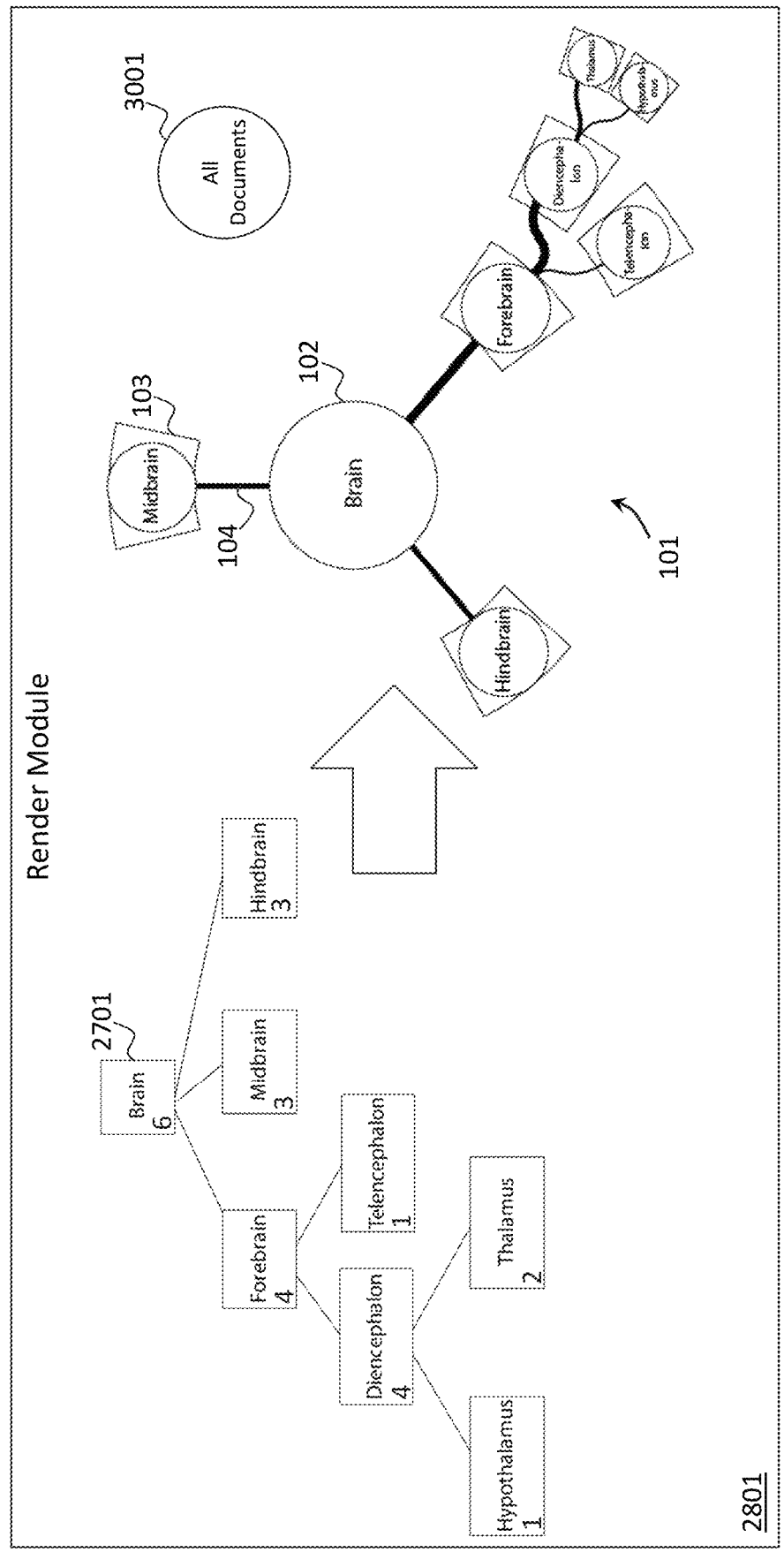
FIG. 30 depicts a second manner by which the consolidated data 2701 are rendered by the render module 2801 of FIG. 28 in an embodiment of the present invention.

FIG. 30 depicts a second embodiment of a rendering by the Render Module 2801 of FIG. 28 as a result of processing the consolidated data 2701 of FIG. 27, in which the hierarchically related topics in 2701 are utilized to render topic nodes 103. Again, the magnitudes associated with each topic in 2701 are used to determine the width of the distribution lines 104 rendered. The central node 102 in this embodiment represents a topic node from the topic hierarchy in 2701, and no node is rendered to represent the full-set of documents returned from an active query. In this embodiment, another mechanism is provided to select the full document set via the orphaned node 3001.

Figure 31:
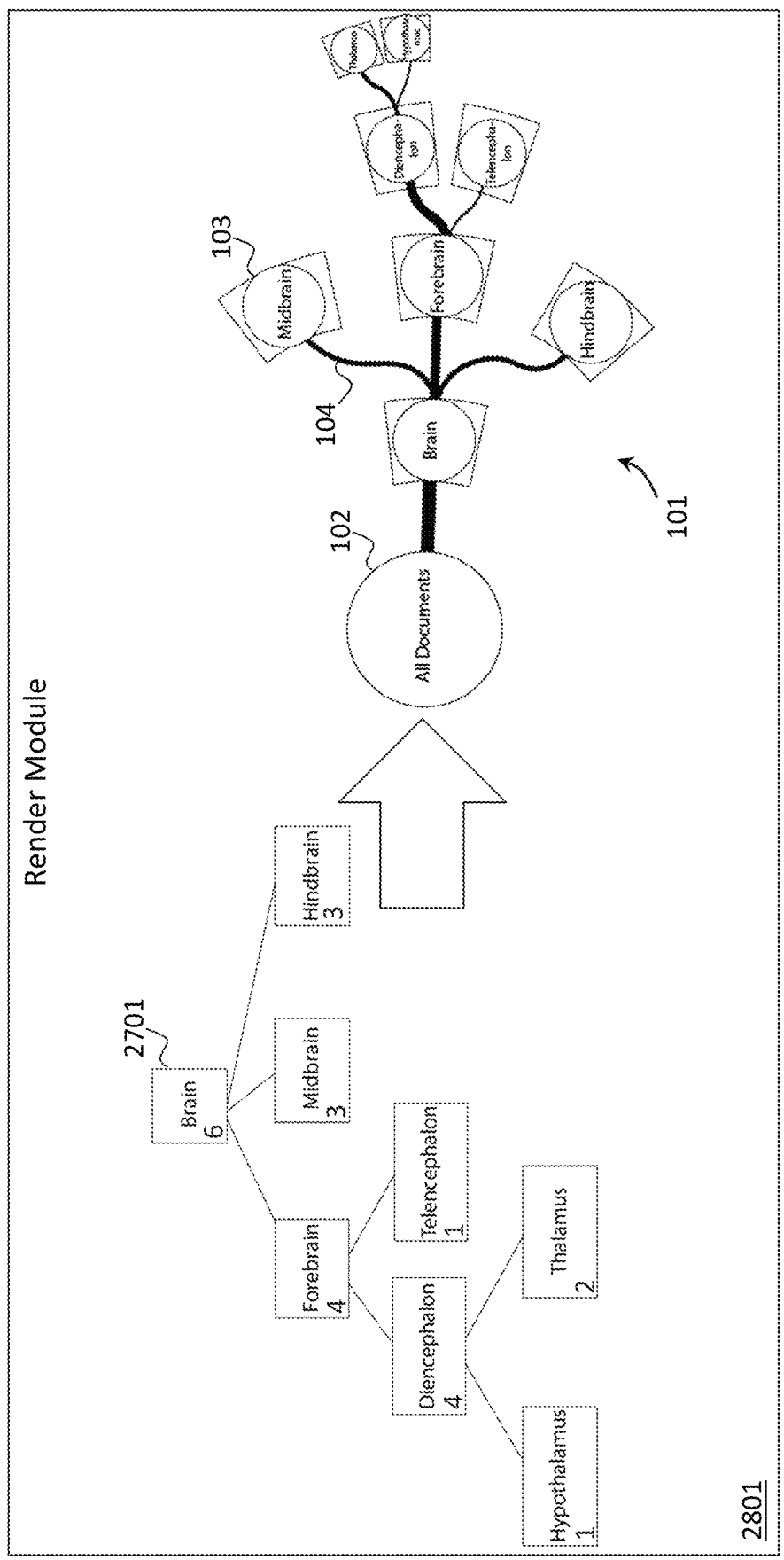
FIG. 31 depicts a third manner by which the consolidated data 2701 are rendered by the render module 2801 FIG. 28 in an embodiment of the present invention.

FIG. 31 depicts a third embodiment of a rendering by the Render Module 2801 of FIG. 28 as a result of processing the consolidated data 2701 of FIG. 27, in which the hierarchically related topics in 2701 are utilized to render topic nodes 103. Again, the magnitudes associated with each topic in the abstract representation of the data on the left-side of the figure are used to determine the width of the distribution lines 104 rendered. In this embodiment, the central node 102 represents the set of all documents returned from a query, and the root topic in the abstract data representation of the hierarchically related topics is also rendered.

FIG. 32 depicts an embodiment of a rendering by the Render Module 2801 of FIG. 28 wherein document data 2301 of FIG. 23, retrieved in response to a user query and stored in the system, is utilized to render search results 107.

Figure 33:
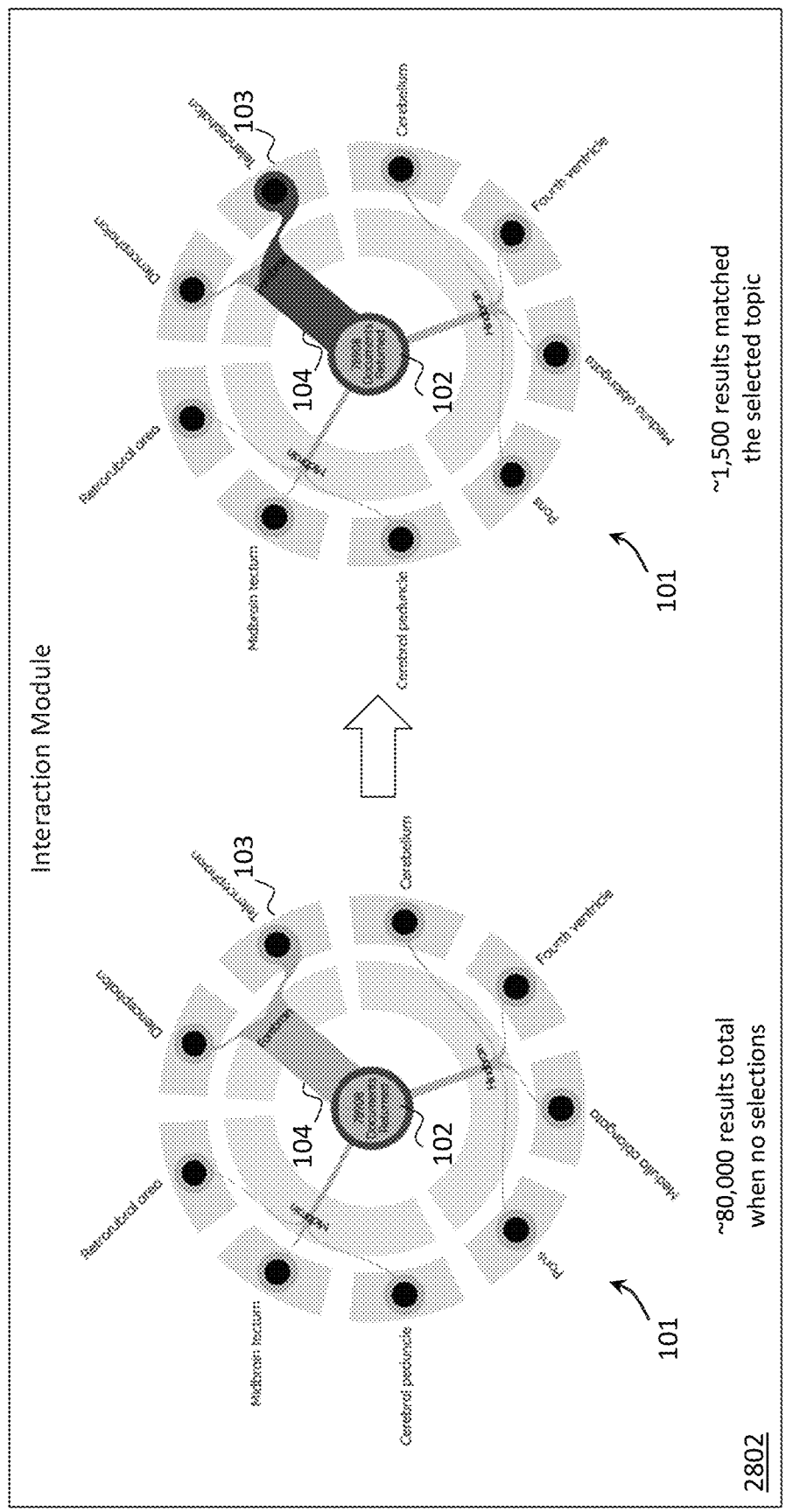
FIG. 33 depicts an example of a basic interaction that the Interaction Module 2802 of FIG. 28 can be programmed to register and process in an embodiment of the present invention.

FIG. 33 depicts an example of a basic interaction that the interaction module 2802 of FIG. 28 can be encoded to account for. In the embodiment depicted, clicking a topic node 102 or distribution line 104 connecting to a topic node 103 triggers the selection of the topic node 103. Selection of a topic node 103, triggers the generation of a new query and retrieving of the subset of results that correspond to the topic node 103 selected. Refer to FIG. 17-FIG. 19 for more sophisticated explanations of suggested interactions.

Figure 34:
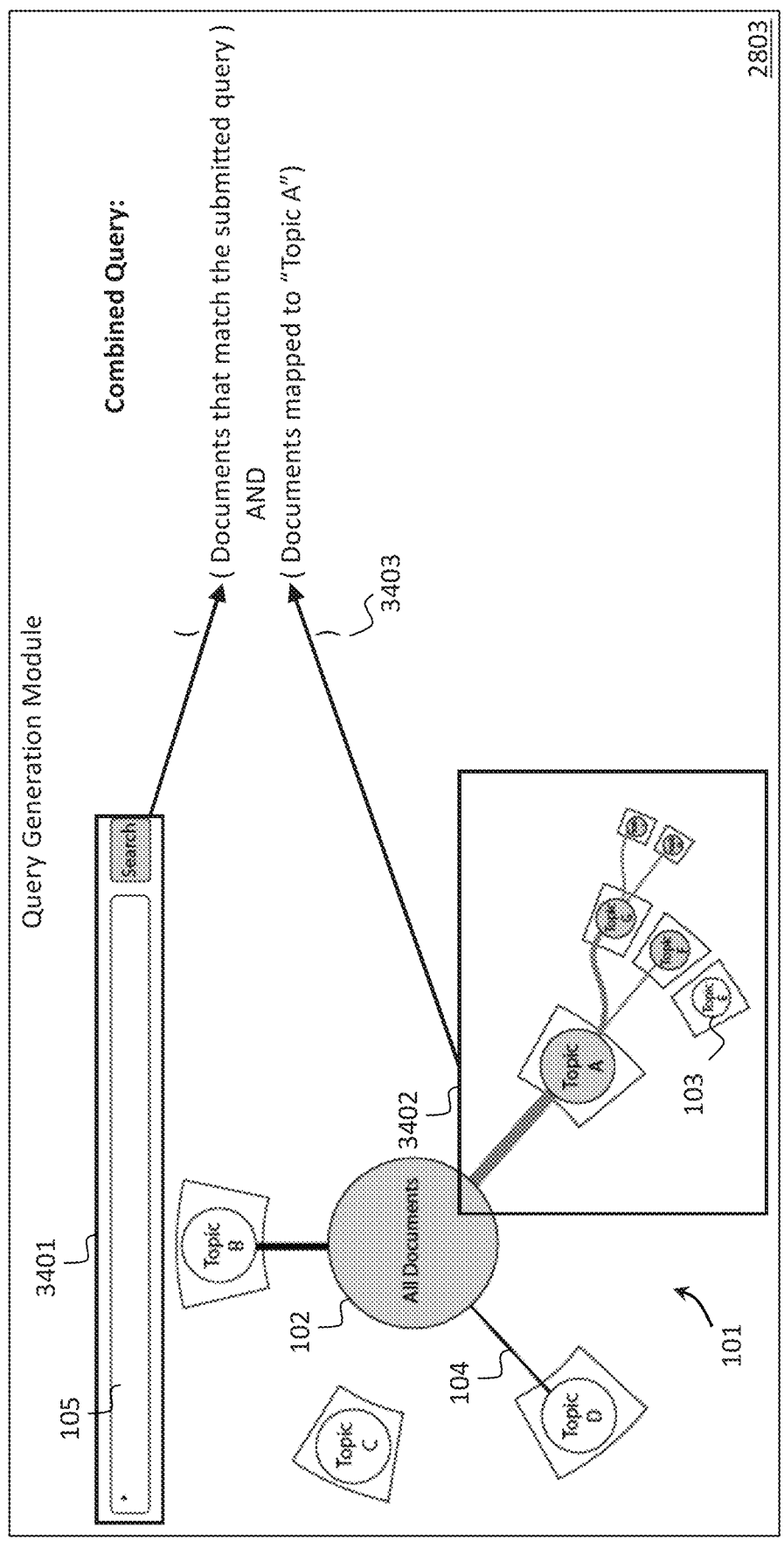
FIG. 34 depicts an example of how the Query Generation Module 2803, of FIG. 28 might be implemented to interpret the application state depicted and convert it into a query in an embodiment of the present invention.

FIG. 34 depicts an example of how the Query Generation Module 2803 might be implemented to interpret the application state depicted and convert it into a query. Note that the search bar 105 is not required, and the Sieve can be combined with any other search facets desired as well. In the current system state, a user query 3401 is entered in the search bar 105, and a selection 3402 has been made on "Topic A". In the embodiment depicted, the system retrieves all documents that matched the search query that also are mapped to "Topic A". Furthermore, in this embodiment any document mapped to a subtopic is also considered to be mapped to the parent topic. Therefore, a selection of "Topic A" also retrieves documents that are mapped with "Topic G", "Topic F", "Topic E", "Topic I", and "Topic H". The combined query is described in 3403.

Figure 35:
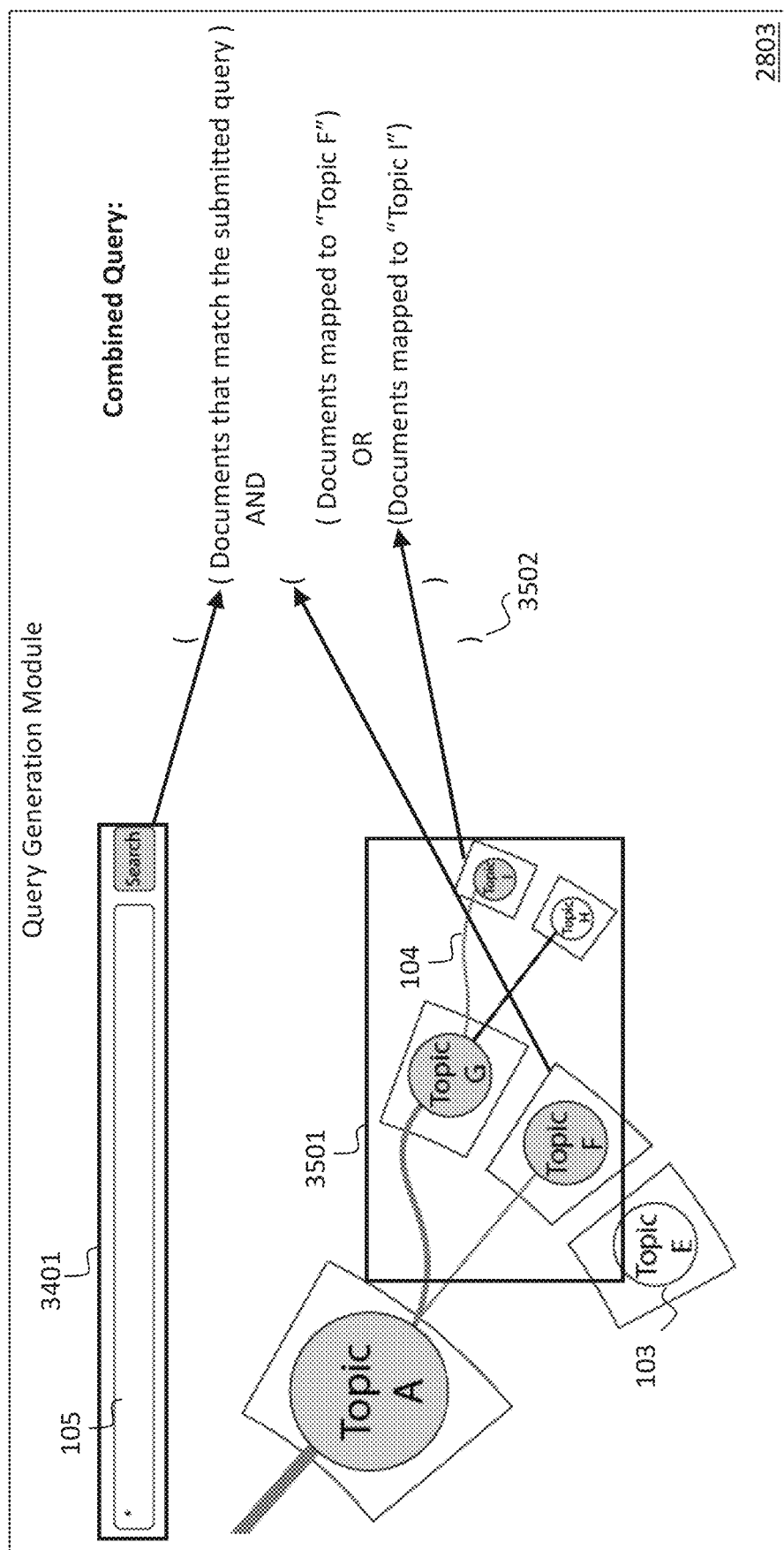
FIG. 35 is a further representation of the display associated with the embodying system depicted in FIG. 34, with a more complex example of how a query can be generated given a more complex selection state of the interface.

FIG. 35 is a further representation of the display associated with the embodying system depicted in FIG. 34, with a more complex example of how a query can be generated given a more complex selection state of the interface. In contrast to FIG. 34, this FIG. 35 depicts a system state where a multi-selection 3501 has been made on "Topic I" and "Topic F". 3502 contains a more sophisticated description of the combined query.

Figure 36:
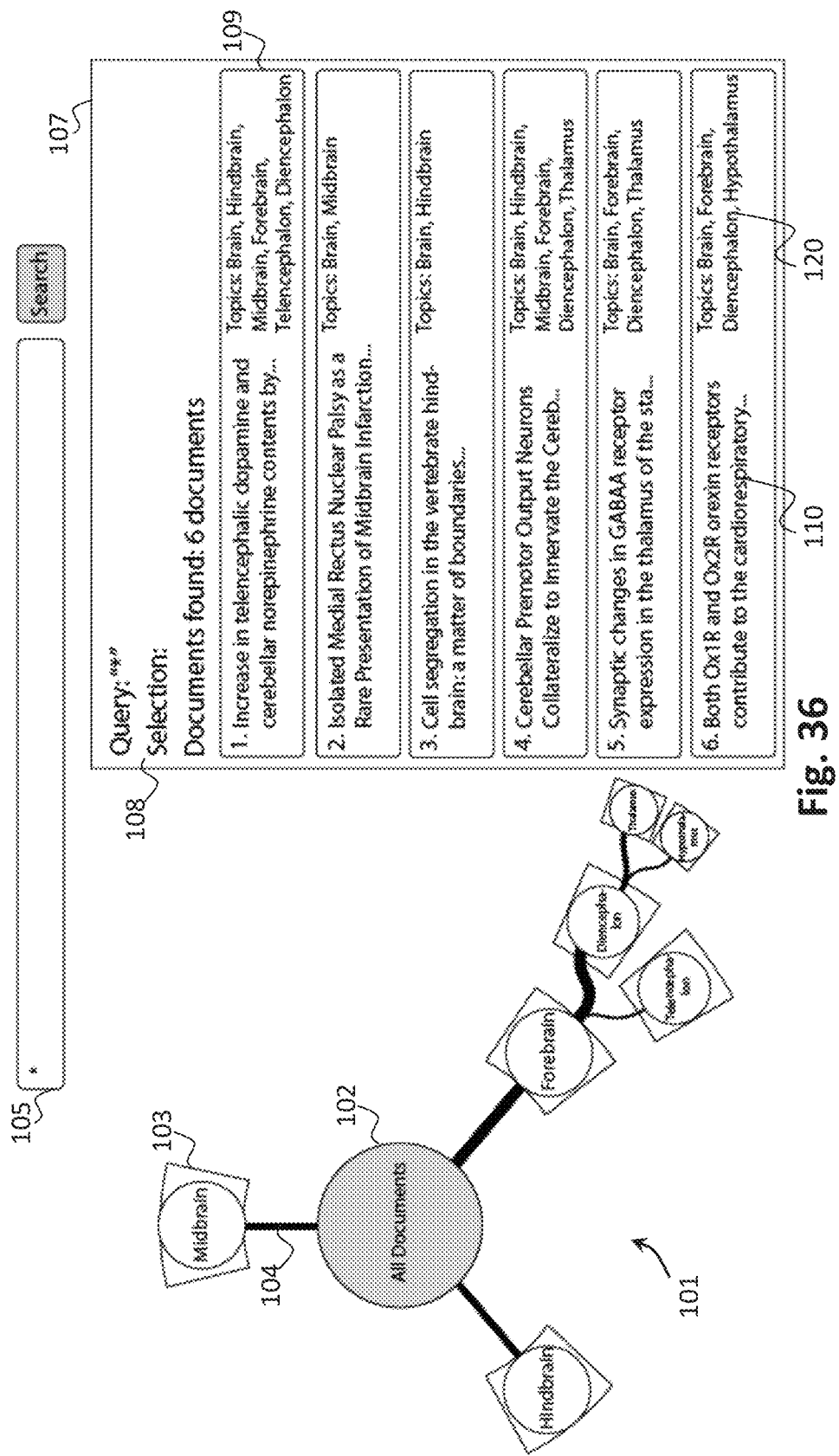
FIG. 36 depicts a simplified example of an embodiment of the present invention that features a total of 6 neuroscience related documents and a simplified topic map, describing the human anatomy of the brain.

FIG. 36 depicts a simplified example of an embodiment of the present invention, that features a total of 6 neuroscience related documents and a simplified topic map describing the human anatomy of the brain. In this FIG. 36, a "*" query, meaning return all documents, has been submitted and no selections have been made. Therefore, all documents are returned, regardless of their mappings. In Boolean logic, the query depicted can be stated as: (*).

Figure 37:
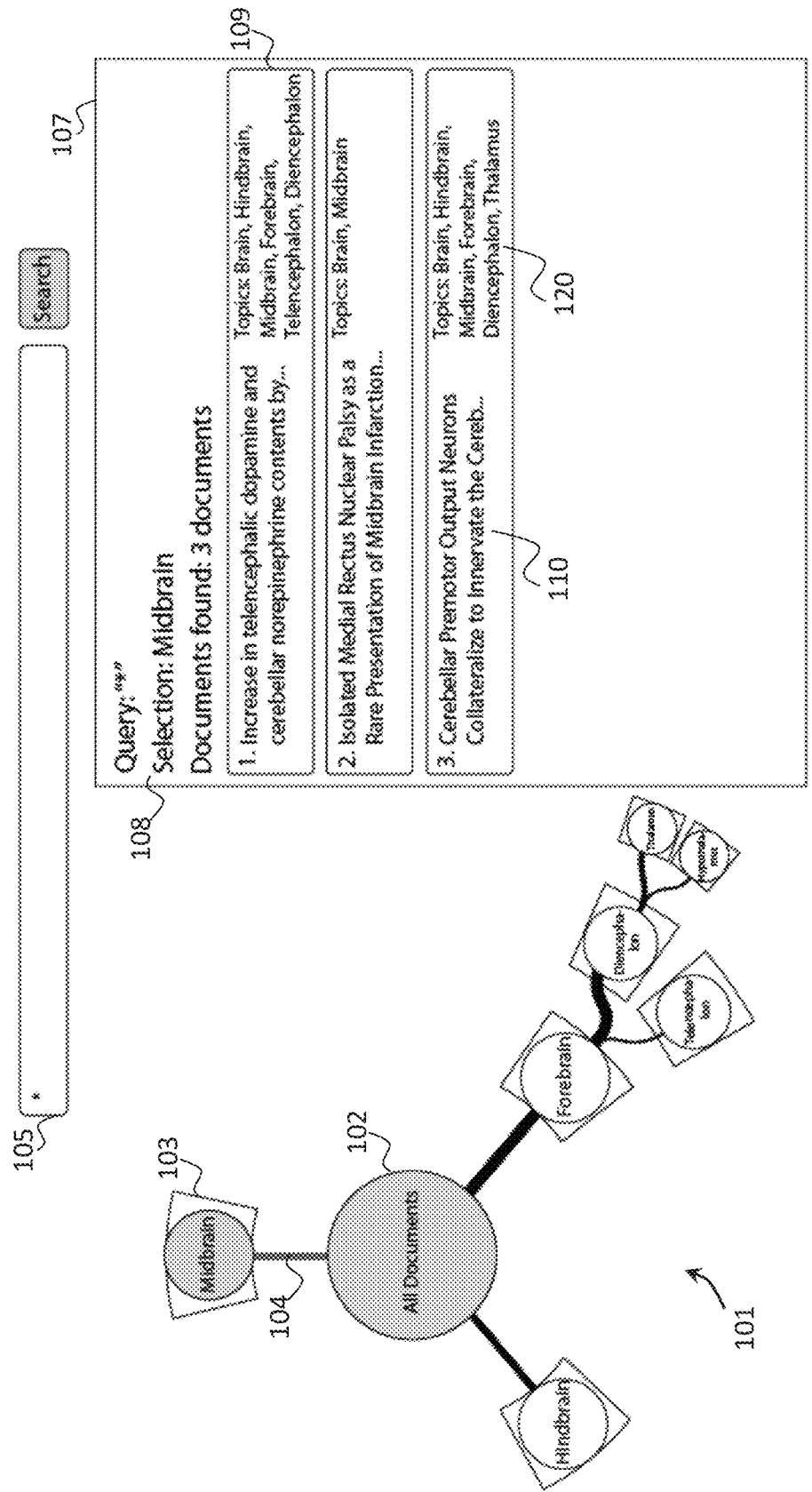
FIG. 37 is a further representation of the display associated with the embodying system in FIG. 36, where the user has made a selection on the topic "Midbrain" in FIG. 36.

FIG. 37 is a further representation of the display associated with the embodying system in FIG. 36, but with a selection made on the topic "Midbrain", indicating a query of all available documents that are also related to the topic "Midbrain". In Boolean logic, the query can be stated as: ((*) A (mapping: "Midbrain")).

Figure 38:
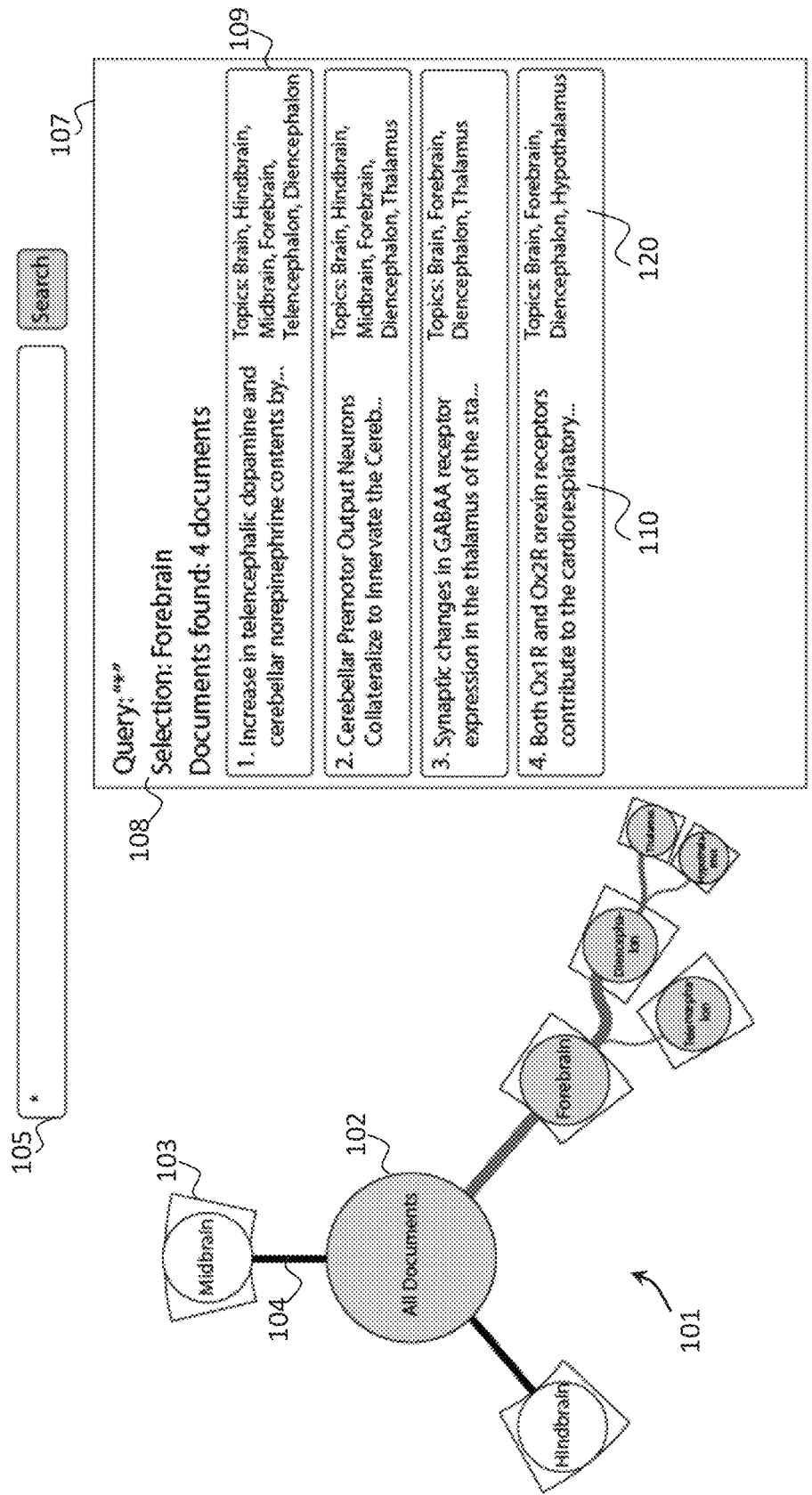
FIG. 38 is a further representation of the display associated with the embodying system in FIG. 37, where the user has selected "Forebrain" in FIG. 37.

FIG. 38 is a further representation of the display associated with the embodying system in FIG. 37, but with a selection made on the topic "Forebrain", indicating a query of all available documents that are also related to the topic "Forebrain", or any of its subtopics. In Boolean logic, the query can be stated as: ((*) A (mapping: "Forebrain")).

Figure 39:
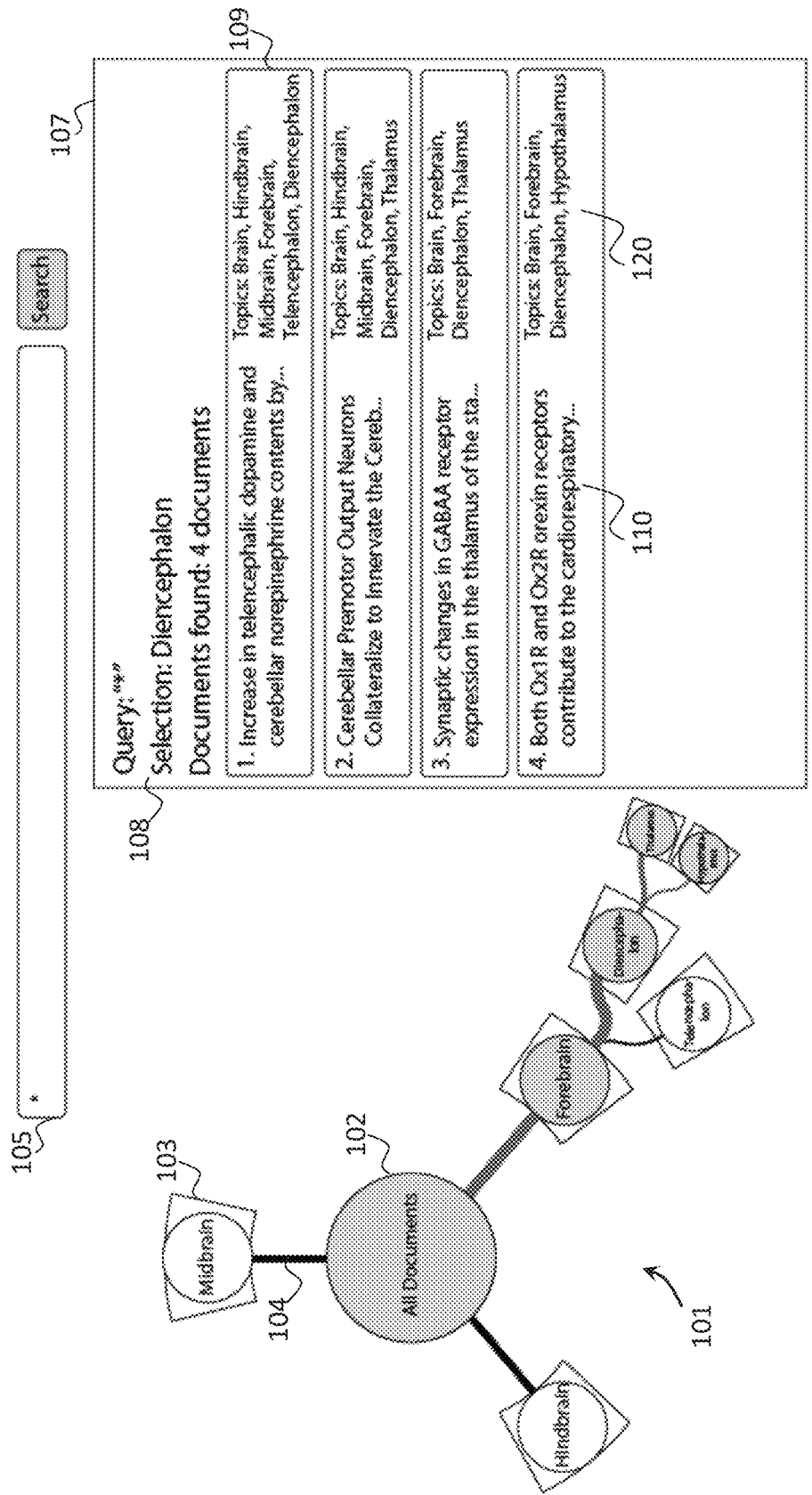
FIG. 39 is a further representation of the display associated with the embodying system in FIG. 38, where the user has selected "Diencephalon" in FIG. 38.

FIG. 39 is a further representation of the display associated with the embodying system in FIG. 38, but with a selection made on the topic "Diencephalon", indicating a query of all available documents that are also related to the topic "Diencephalon", or any of its subtopics. In Boolean logic, the query can be stated as: ((*) A (mapping: "Diencephalon")).

Figure 40:
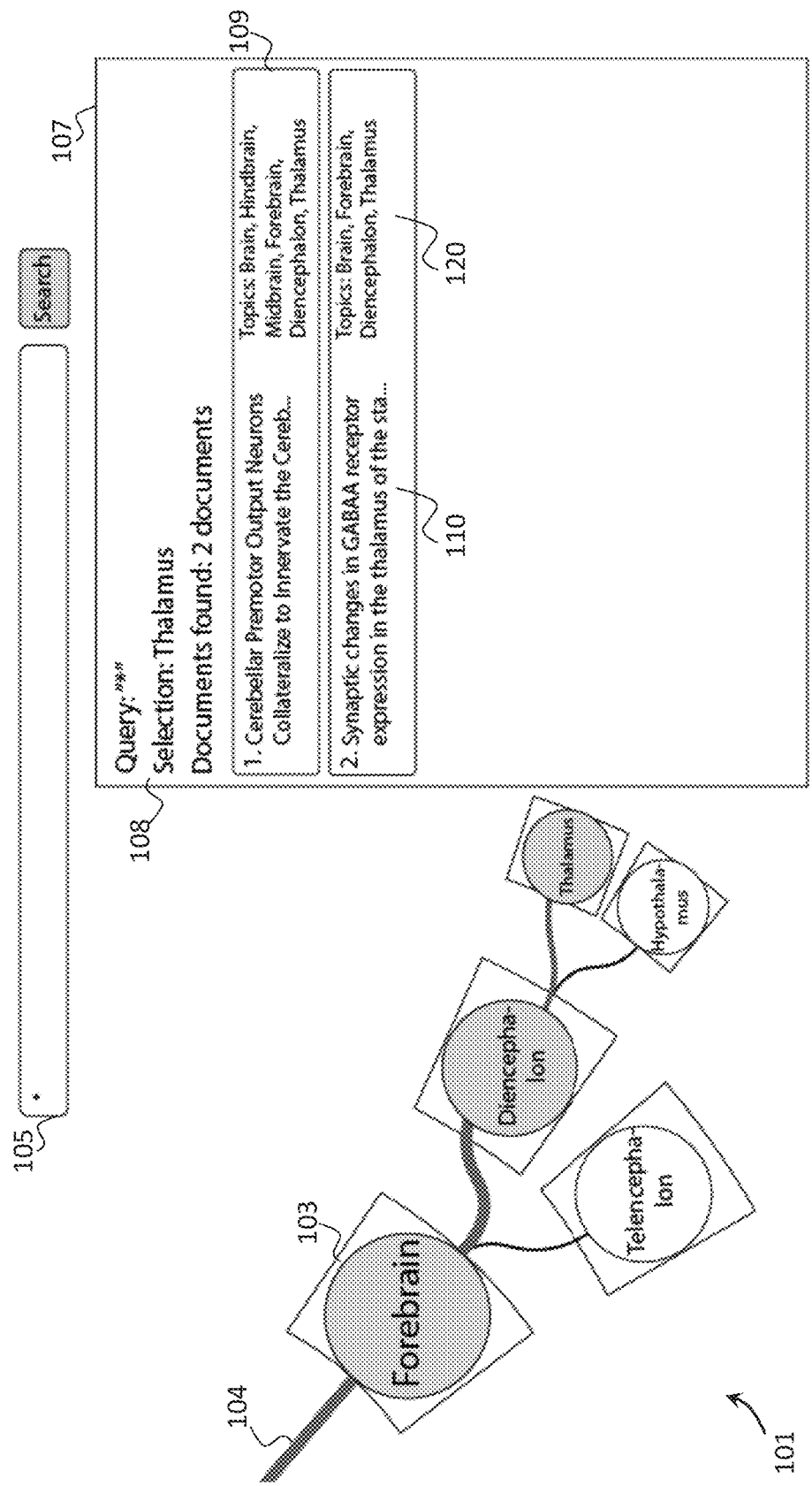
FIG. 40 is a further representation of the display associated with the embodying system in FIG. 39, where the user has selected the topic "Thalamus" in FIG. 39.

FIG. 40 is a further representation of the display associated with the embodying system in FIG. 39, but with a selection made on the topic "Thalamus", indicating a query of all available documents that are also related to the topic "Thalamus". In Boolean logic, the query can be stated as: ((*) A (mapping: "Thalamus")).

Figure 41:
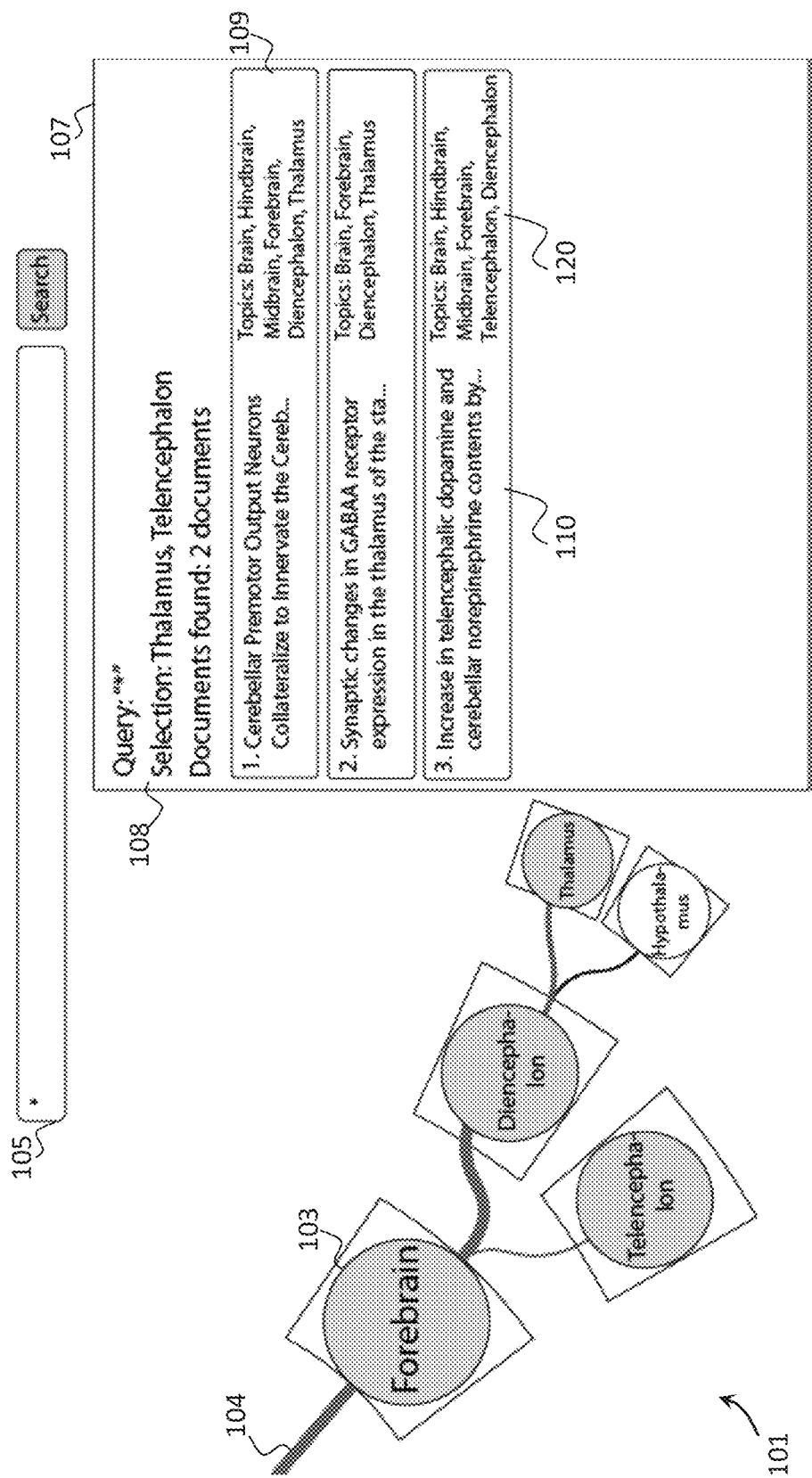
FIG. 41 is a further representation of the display associated with the embodying system in FIG. 40, where the user has made selections on "Thalamus" and "Telencephalon", and has used the pan/zoom feature to focus on the topic "Forebrain" and its transitive subtopics.

FIG. 41 is a further representation of the display associated with the embodying system in FIG. 40, but with selections made on the topics "Thalamus" and "Telencephalon", indicating a query of all available documents that are also related to either the topic "Thalamus" or the topic "Telencephalon", or any of their subtopics. In Boolean logic, the query can be stated as: ((*)^((mapping: "Thalamus") V (mapping: "Telencephalon")).

Figure 42:
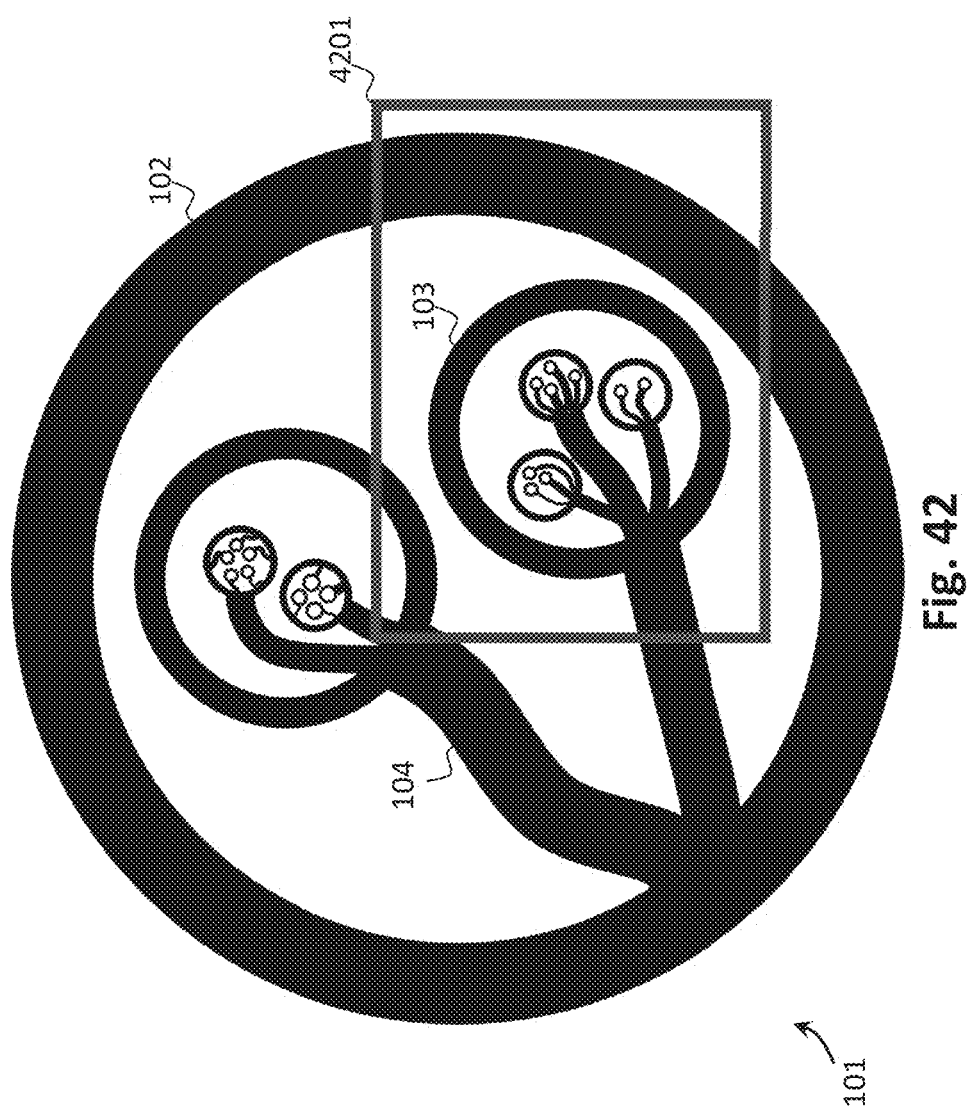
FIG. 42 is an embodiment of the sieve diagram in which the central node is rendered in the periphery. A red rectangular box highlights an area that will be zoomed-into in FIG. 43.

FIG. 42 is an embodiment of the sieve diagram 101 in which the central node 102 is rendered in the periphery. Distribution Lines 104 emanate from the central node 102 to connect directly or transitively to topic nodes 103. A red rectangular box 4201 is depicted on top of the interface to aid the reader of this document in identifying the region of the diagram that will be zoomed into in FIG. 43.

Figure 43:
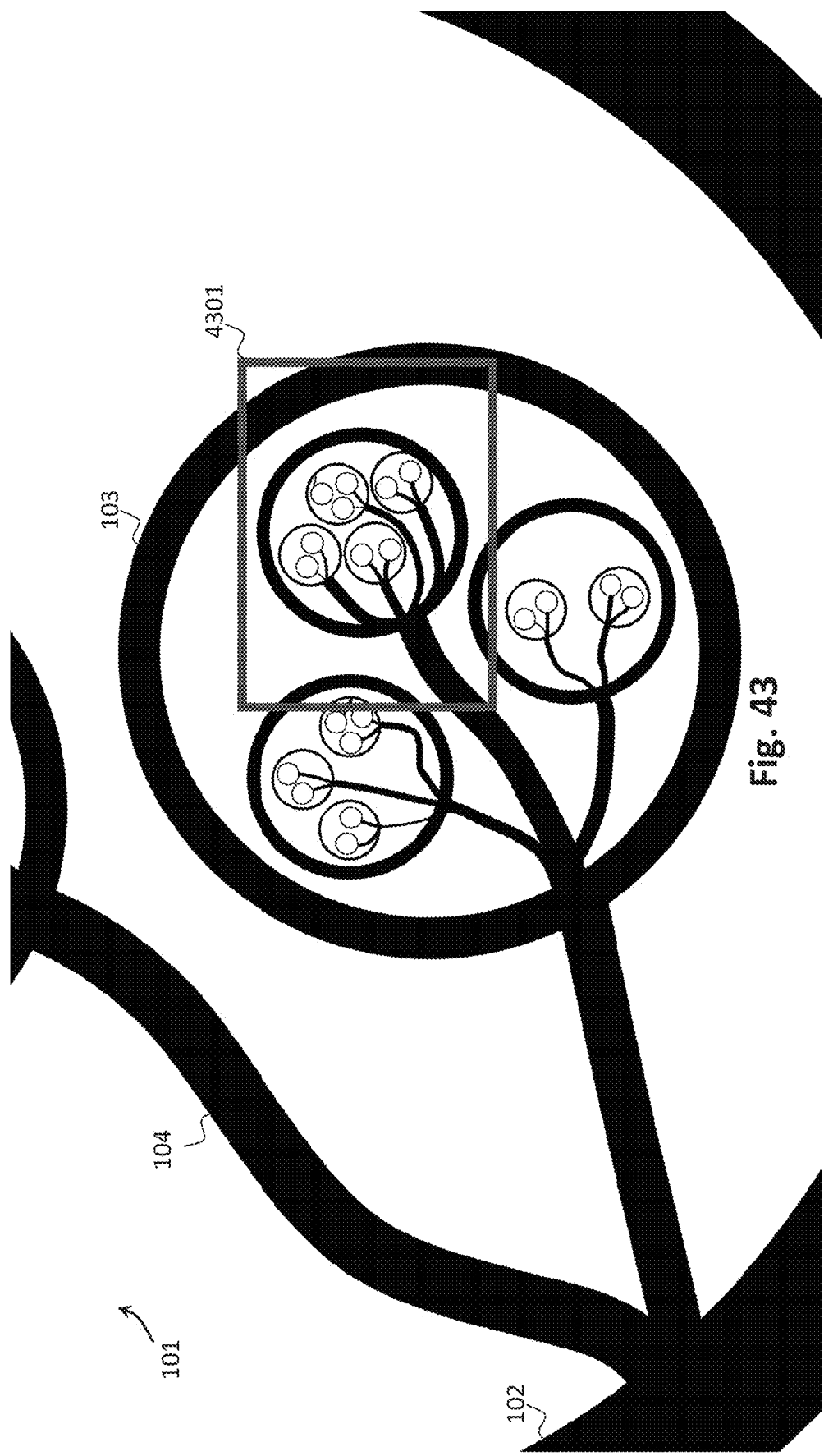
FIG. 43 is a further representation of the embodiment of the sieve diagram depicted in FIG. 42 in which the interface uses the pan/zoom feature to enlarge the area highlighted by the red rectangle in FIG. 42. The red rectangular box highlights an area that will be enlarged in FIG. 44.

FIG. 43 is a further representation of the embodiment of the sieve diagram depicted in FIG. 42, in which the user has utilized the/pan/zoom functionality to zoom into the area of the diagram identified by the box 4201 in FIG. 42. The red rectangular box 4301 of FIG. 43 identifies a region that has been selected for enlargement in FIG. 44.

Figure 44:
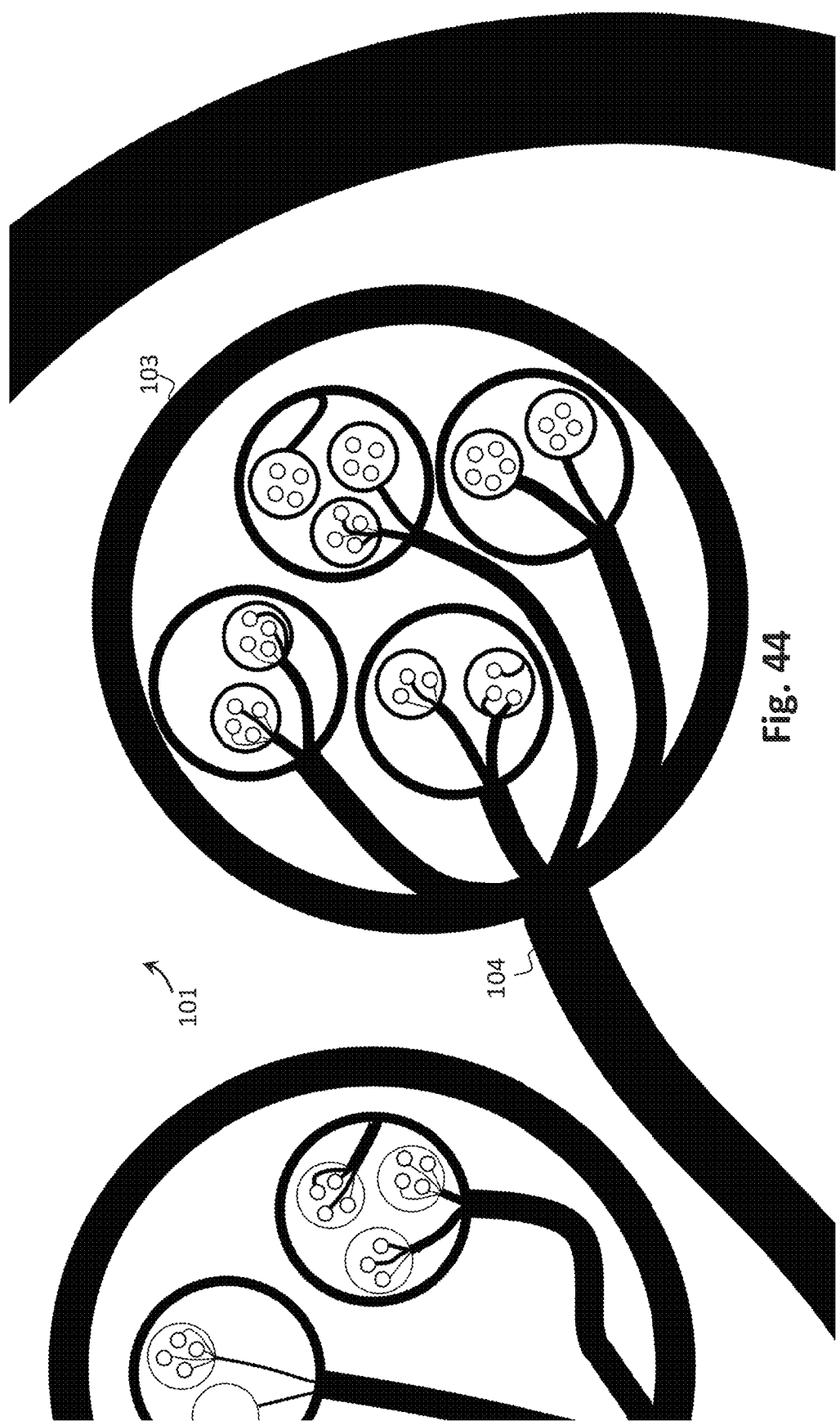
FIG. 44 is a further representation of the embodiment of the sieve diagram depicted in FIG. 43 in which the interface has used the pan/zoom feature to enlarge the area highlighted by the red rectangle in FIG. 43.

FIG. 44 is a further representation of the embodiment of the sieve diagram depicted in FIG. 43, in which the user has utilized the pan/zoom feature to zoom into the area identified by the red rectangle 4301 of FIG. 43.

FIG. 45 is a perspective rendering of a three-dimensional sieve diagram in another embodiment of the present invention. In this embodiment, the distribution of a user's investments across a variety of funds is depicted. In the image depicted, the user has selected the "Crypto" fund and is able to see additional details, in this case total amount invested, in the fund's members: "Bitcoin" and "Ether". A three-dimensional sieve diagram is likely to be more suitable for use with AR (Augmented Reality) and VR (Virtual Reality) systems. In place of a "pan" feature, this embodiment may include a robust "rotation" feature, along with a "zoom".

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), pre-loaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

While the invention has been particularly shown and described with reference to specific embodiments, it will be understood by those skilled in the art that various changes in form and detail may be made therein without departing from the spirit and scope of the invention as defined by the appended clauses. While some of these embodiments have been described in the claims by process steps, an apparatus comprising a computer with associated display capable of executing the process steps in the claims below is also included in the present invention. Likewise, a computer program product including computer executable instructions for executing the process steps in the claims below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method for interactive visualization of a first set of objects in relation to a second set of objects in a data collection, wherein each of the second set of objects is hierarchically structured, the method implemented by computer processes comprising:
   storing the first set of objects and storing the second set of objects;
   parsing the first set of objects in relation to the second set of objects in order to generate a mapping between the first set of objects and the second set of objects;
   storing the mapping;
   causing an interactive graphical display of a representation of the first set of objects as a central node and a representation of the second set of objects as a set of topic nodes surrounding the central node or surrounded by the central node, the displayed representations constituting a sieve diagram;
   using the mapping to cause display in the sieve diagram of a set of relationships between the first set of objects and the second set of objects by providing a graphical linkage directly or indirectly between the central node and each node that corresponds to a member of the second set of objects, wherein the graphical linkage has a feature that graphically indicates a quantity associated with the mapping; and
   responsive to graphical selection, by a user, in the sieve diagram of a subset of topic nodes corresponding to a topic subset of the second set of objects, displaying an object subset, of the first set of objects, that is mapped to the topic subset.

2. A computer-implemented method according claim 1, the method further comprising:
   receiving a search query;
   responsive to the received search query, performing a search, among the first set of objects, for a search results set of objects having a set of features matching features of the search query; and
   causing display of the search results set of objects.

3. A computer-implemented method according to claim 2, wherein the causing display of the search results set of objects includes causing display thereof as a list and causing display thereof as elements of the sieve diagram.

4. A computer-implemented method according to claim 1, wherein the graphical linkage is a distribution line.

5. A computer-implemented method according to claim 1, the method further comprising:
   upon receiving a graphical selection by the user of a given one of the topic nodes in the sieve diagram, causing filtering of the first set of objects displayed to include only those objects corresponding to objects in the second set that are represented by the selected topic node.

6. A computer-implemented method according to claim 1, the method further comprising:
   upon receiving a graphical selection by the user of a given distribution line in the sieve diagram, causing filtering of the first set of objects displayed to include only those objects corresponding to objects in the second set that are represented by the topic nodes to which the selected distribution line connects.

7. A computer-implemented method according to claim 1, the method further comprising:
   upon receiving a graphical selection by the user of a given central node in the sieve diagram, causing removal of any filtering caused by graphical selection of a topic node or of a distribution line.

8. A computer-implemented method according to claim 5, further comprising, upon the graphical selection by the user of the given one of the topic nodes, causing display of information pertinent to the selected topic node.

9. A computer-implemented method according to claim 6, further comprising, upon the graphical selection by the user of the given distribution line, causing display of information pertinent to the selected distribution line or the topic node to which the selected distribution line connects.

10. A computer-implemented method according to claim 2, wherein the search query includes a Boolean expression, and wherein the method further includes evaluating the Boolean expression and performing the search using the evaluated expression.

11. A computer-implemented method according to claim 2, wherein the search query is defined at least in part by user selection of a set of graphical elements in the sieve diagram.

12. A computer-implemented method according to claim 1, wherein the search query includes at least one Boolean operator defined by a user input.

13. A computer-implemented method according to claim 2, further comprising, upon receipt of a user command to shrink displayed membership of the first set, causing the sieve diagram to display, as members of the first set, only those objects having features matching features of the search query.

14. A computer-implemented method according to claim 1, the method further comprising:
  on invocation by a user of a topic map limiter, limiting display of objects in the second set.

15. A computer-implemented method according to claim 14, wherein the topic map limiter is configured to allow a user to specify how many tiers of the hierarchically structured second set of objects are displayed.

16. A computer-implemented method according to claim 14, wherein the topic map limiter allows selection by the user of which topics to eliminate from the sieve diagram.

17. A computer-implemented method according to claim 14, wherein the topic map limiter allows selection by the user of which topics to include in the sieve diagram.

18. A computer-implemented method according to claim 1, wherein the quantity associated with the mapping is the number of objects in the retrieved object subset, of the first set of objects, that is mapped to the topic subset and the graphical feature is a width of the linkage.

* * * * *